(12) United States Patent
Akama

(10) Patent No.: US 7,979,353 B2
(45) Date of Patent: Jul. 12, 2011

(54) ELECTRONIC TRANSACTION METHOD USING AN ELECTRONIC COUPON

(75) Inventor: Katsuaki Akama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 943 days.

(21) Appl. No.: 10/729,817

(22) Filed: Dec. 5, 2003

(65) Prior Publication Data

US 2004/0128241 A1 Jul. 1, 2004

Related U.S. Application Data

(63) Continuation of application No. PCT/JP01/04737, filed on Jun. 5, 2001.

(51) Int. Cl.
  G06F 17/60 (2006.01)
  G06Q 30/00 (2006.01)
(52) U.S. Cl. .............................. 705/50; 705/15; 709/219
(58) Field of Classification Search .................... 705/14, 705/50; 709/219
See application file for complete search history.

(56) References Cited

U.S. PATENT DOCUMENTS

| | | | |
|---|---|---|---|
| 5,006,976 A * | 4/1991 | Jundt | 700/79 |
| 5,208,858 A * | 5/1993 | Vollert et al. | 380/43 |
| 5,241,594 A * | 8/1993 | Kung | 713/151 |
| 5,855,007 A * | 12/1998 | Jovicic et al. | 705/14 |
| 5,936,220 A | 8/1999 | Hoshino et al. | |
| 6,012,038 A * | 1/2000 | Powell | 705/14.39 |
| 6,076,069 A * | 6/2000 | Laor | 705/14 |
| 6,151,587 A * | 11/2000 | Matthias | 705/14.1 |
| 6,292,786 B1 * | 9/2001 | Deaton et al. | 705/14.25 |
| 6,332,126 B1 * | 12/2001 | Peirce et al. | 705/14.25 |
| 6,336,098 B1 * | 1/2002 | Fortenberry et al. | 705/14.23 |
| 6,360,206 B1 * | 3/2002 | Yamashita | 705/14 |
| 6,411,942 B1 | 6/2002 | Fujimoto | |
| 6,424,950 B1 * | 7/2002 | Weller | 705/50 |
| 6,497,360 B1 * | 12/2002 | Schulze, Jr. | 235/381 |
| 6,505,773 B1 * | 1/2003 | Palmer et al. | 235/380 |
| 6,595,417 B2 * | 7/2003 | O'Hagan et al. | 235/383 |
| 6,611,811 B1 * | 8/2003 | Deaton et al. | 705/14.39 |
| 6,739,514 B2 * | 5/2004 | Sanders et al. | 235/472.03 |
| 6,754,636 B1 * | 6/2004 | Walker et al. | 705/50 |
| 6,839,683 B1 * | 1/2005 | Walker et al. | 705/14.19 |
| 6,842,741 B1 | 1/2005 | Fujimura | |

(Continued)

FOREIGN PATENT DOCUMENTS

EP 0 950 968 A1 10/1999

(Continued)

OTHER PUBLICATIONS

Notice of Ground(s) of Rejection dated Mar. 2, 2010, from the corresponding Japanese Application No. 2003-502750.

(Continued)

Primary Examiner — Evens J Augustin
(74) Attorney, Agent, or Firm — Katten Muchin Rosenman LLP

(57) ABSTRACT

In an electronic transaction on the Internet, an electronic coupon having pecuniary value information usable in the electronic transaction and owner identification information based on information characteristic of an information terminal is issued to the information terminal, the pecuniary value information and the owner identification information of the electronic coupon are recorded and managed as coupon management information in a transfer management memory, and the owner identification information in the transfer management memory is changed according to a transferee apparatus of the electronic coupon, whereby a settlement in the electronic transaction can be made simply and safely.

13 Claims, 17 Drawing Sheets

U.S. PATENT DOCUMENTS

| | | | |
|---|---|---|---|
| 6,993,498 B1 * | 1/2006 | Deaton et al. .................... | 705/20 |
| 7,062,471 B1 | 6/2006 | Matsuyama et al. | |
| 7,103,572 B1 | 9/2006 | Kawaguchi et al. | |
| 7,340,419 B2 * | 3/2008 | Walker et al. ................. | 705/26.7 |
| 7,398,226 B2 * | 7/2008 | Haines et al. ................. | 705/14.1 |
| 7,401,032 B1 * | 7/2008 | Golden et al. ............. | 705/14.39 |
| 7,421,645 B2 * | 9/2008 | Reynar .......................... | 715/206 |
| 7,552,069 B2 * | 6/2009 | Kepecs ..................... | 705/14.25 |
| 7,587,333 B1 * | 9/2009 | Walker et al. ................... | 705/15 |
| 7,599,850 B1 * | 10/2009 | Laor ......................... | 705/14.26 |
| 7,624,038 B1 * | 11/2009 | Wood et al. ................ | 705/14.26 |
| 7,668,747 B2 * | 2/2010 | Murphy et al. ........... | 705/14.26 |
| 7,668,782 B1 * | 2/2010 | Reistad et al. .................. | 705/50 |
| 7,711,604 B1 * | 5/2010 | Walker et al. ............... | 705/26.5 |
| 7,747,699 B2 * | 6/2010 | Prueitt et al. .................. | 709/219 |
| 7,899,710 B1 * | 3/2011 | Walker et al. ................... | 705/37 |
| 7,916,322 B2 * | 3/2011 | Pineau .......................... | 358/1.15 |
| 7,917,386 B2 * | 3/2011 | Christensen ................ | 705/14.1 |
| 2007/0016533 A1 | 1/2007 | Fujimura | |
| 2009/0125429 A1 | 5/2009 | Takayama | |

FOREIGN PATENT DOCUMENTS

| | | |
|---|---|---|
| JP | 9-54808 | 2/1997 |
| JP | 9-218905 | 8/1997 |
| JP | 9-237299 | 9/1997 |
| JP | 9-297789 | 11/1997 |
| JP | 10-154192 | 6/1998 |
| JP | 11-175851 | 7/1999 |
| JP | 11-184947 | 7/1999 |
| JP | 11-250193 | 9/1999 |
| JP | 11-328269 | 11/1999 |
| JP | 2000-123095 | 4/2000 |
| JP | 2000-306003 | 11/2000 |
| JP | 2001-5895 | 1/2001 |
| JP | 2001-56835 | 2/2001 |
| JP | 2001-142974 | 5/2001 |
| WO | 99/09502 | 2/1999 |

OTHER PUBLICATIONS

Decision of Rejection dated Jun. 1, 2010, from the corresponding Japanese Application.

Notice of Ground(s) of Rejection, dated Oct. 27, 2009 from corresponding Japanese Application No. 2003-502750.

* cited by examiner

FIG. 6

| TRANSFER MANAGEMENT TABLE |
|---|
| COUPON NUMBER |
| TERM OF VALIDITY OF COUPON |
| STATUS OF COUPON (ISSUED, TEMPORARILY TRANSFERRED, TRANSFERRED, DURING COMMUNICATION) |
| ISSUANCE REQUESTER (TELEPHONE NUMBER OR SHOP NUMBER) |
| TRANSFEREE (TELEPHONE NUMBER OR SHOP NUMBER) |
| TRANSFER NUMBER |
| ......... |
| COUPON N |

ELECTRONIC TRANSACTION METHOD USING AN ELECTRONIC COUPON

CROSS-REFERENCE TO RELATED APPLICATION

The present application is a continuation of International Application No. PCT/JP01/004737 which was filed on Jun. 5, 2001.

FIELD OF THE INVENTION

The present invention relates to a technique for an electronic transaction with a portable terminal such as a cellular phone, a PDA (Personal Digital Assistance) or the like on the Internet or the like.

BACKGROUND OF THE INVENTION

FIG. 16 is a diagram for illustrating an electronic transaction system and its operation. The electronic transaction system shown in FIG. 16 comprises, for example, an electronic shop server 100 which opens an electronic shop site (hereinafter referred simply as an electronic shop) on the Internet (WWW: World Wide Wed), and operates and manages it, a portable terminal 300 accessible to the electronic shop site (the electronic shop server 100) via a carrier server 200 disposed in a mobile terminal network (a mobile carrier network), and a settlement server 400 disposed in a settlement institution which contracts settlement of payment for an article or the like (commercial transaction payment) that a user (a buyer) has purchased using the portable terminal 300 at the electronic shop.

Each of the terminal 300, and the servers 100, 200 and 400 has a communication function using an encryption communication protocol such as TLS (Transport Layer Security), SSL (Secure Socket Layer) or the like, whereby security such as concealment of authentication or data (prevention of leakage), prevention of tampering and the like is ensured between the portable terminal (hereinafter referred simply as a terminal) 300 and the carrier server 200, the carrier server 200 and the electronic shop server 100, and the electronic shop server 100 and the settlement server 400.

Concretely, in the above TLS or SSL, negotiations [issuing an electronic ID for server authentication, deciding a user private key (encryption method) to encrypt data, adding a MAC (Message Authentication Code) to a transmission message to prevent data from being tampered] called "handshake protocol" are carried out between the terminal 300 and the server 200 or the server 200 (100) and the server 100 (400) in prior to the encryption communication, whereby the above security is ensured.

Namely, issuing an electronic ID allows confirmation that the server 100, 200 or 400 is a valid server authenticated by a CA (Certificate Authority), encrypting/decrypting data with a user private key can prevent the data from leaking, and verification with an MAC helps to find data tampering.

After the security of a communication path 600 between, for example, the terminal 300 and the electronic shop server 100 is ensured as above, the user of the terminal 300 sends personal information such as a credit card number, a password or the like from the terminal 300 to the electronic shop 100 to request the electronic shop to settle payment in the commercial transaction (refer to a reference character 700).

The electronic shop server 100 sends the commercial transaction payment and the personal information as settlement information together with own electronic ID 500 to the settlement server 400 over a communication path 800 where security is ensured between the electronic shop server 100 and the settlement server 400 by conducting negotiations similar to the above. The settlement server 400 confirms that the electronic ID 500 received from the electronic shop server 100 is valid, then settles the commercial transaction payment on the basis of the received settlement information.

In the known electronic transaction system, the personal information (a credit card number, a password, etc.) sent from the terminal 300 is decrypted into text data in the electronic shop server 100 in order to confirm contents of the commercial transaction and contents of the order from the terminal 300 in the electronic shop server 100, as schematically shown in FIG. 17. If a hacker or the like intrudes (has an unauthorized access) into the electronic shop server 100, there is a possibility that the credit card number, the password or the like of the user easily leaks.

There is another possibility that when the user inputs his/her credit card number or password into the terminal 300, a third party steals a glance at the user's operation and abuses them.

In the light of the above problems, an object of the present invention is to allow an easy, safe settlement in an electronic transaction by using an electronic coupon having pecuniary value information and owner information not related to information about a credit card number, a password, or the like.

SUMMARY OF THE INVENTION

To achieve the above object, according to the present invention, the following electronic transaction is carried out in an electronic transaction system comprising an electronic shop server opening an electronic shop site on the Internet, and operating and managing the electronic shop site, a coupon issuance/management server issuing and managing an electronic coupon having pecuniary value information usable in a settlement of an electronic transaction for the electronic shop site, and an information terminal being able to access to the electronic shop site to carry out an electronic transaction.

First, the information terminal requests the coupon issuance/management server to issue an electronic server. When receiving this request, the coupon issuance/management server issues an electronic coupon having pecuniary value information and owner identification information based on information characteristic of the information terminal, records the pecuniary information and the owner identification information of the electronic coupon as coupon management information in a transfer management memory and manages them, and changes the owner identification information in the transfer management memory according to a transferee apparatus (hereinafter referred simply as "a transferee") of the electronic coupon.

The coupon issuance/management server can always manage a valid owner (a rightful person) of the issued electronic coupon, thereby to prevent unauthorized settlement of an electronic transaction. Since the electronic coupon itself includes only pecuniary information and information on who is the owner of the electronic coupon in this case, it is possible to avoid a situation that a credit card number, a password or the like leaks and the user suffers considerable damage as before even if the electronic coupon is transmitted to an electronic shop site opened on the Internet. Accordingly, it becomes possible to carry out a simple, safe settlement of an electronic transaction on the Internet.

As an example of transfer of the electronic coupon, an information terminal to which an electronic coupon has been issued transfers the electronic coupon to an electronic shop server due to an electronic transaction for the electronic shop site. As another example, an information terminal to which an electronic coupon has been issued transfers the electronic coupon to another information terminal. As still another example, this another information terminal transfers the electronic coupon to an electronic shop server due to an electronic transaction for the electronic shop site.

In any case, an information terminal having transferred the electronic coupon notifies the coupon issuance/management server of it, whereby the coupon issuance/management server changes the owner identification information in the transfer management server to information characteristic of a transferee (an electronic shop server or another information terminal). Accordingly, a rightful person of the electronic coupon is always managed properly in the coupon issuance/management server according to transfer of the electronic coupon.

The coupon issuance/management server can affix electronic signatures on the pecuniary value information and the owner identification information of the electronic coupon with different encryption keys. Accordingly, it is possible to effectively prevent information included in the electronic coupon from leaking to a third party, being tampered by a third party, and so forth.

In the above case, the electronic signatures may be affixed (encrypted) on the pecuniary value information and the owner identification information of the electronic coupon with a server private key characteristic of the coupon issuance/management server and a user private key characteristic of the user of the information terminal, respectively, for example. In which case, even when the pecuniary value information is tampered by the user or a third party during a course of distribution (transfer) of the electronic coupon, for example, it is possible to find it in the coupon issuance/management server, and take any measure, for example, to make the electronic coupon null and void. As a result, it is possible to largely improve the safety of electronic transactions using electronic coupons.

Changing of the owner identification information in the transfer management memory may be carried out after the following process: (1) a transferee (an electronic shop or another information terminal) to which the electronic coupon has transferred sends the electronic coupon to the coupon issuance/management server to request the coupon issuance/management server to verify validity of the electronic coupon; (2) the coupon issuance/management server verifies the validity of the electronic coupon on the basis of electronic signatures affixed on the received electronic coupon, and notifies the transferee of a result of the verification; (3) when the validity of the electronic coupon is confirmed as a result of the verification, the transferee requests the coupon issuance/management server to change the owner of the electronic coupon; and (4) when receiving the owner change request, the coupon issuance/management server confirms an information terminal that is a transferor of the electronic coupon whether or not the information terminal has transferred the electronic coupon.

As above, the coupon issuance/management server confirms through verification with the electronic signatures that the electronic coupon has not been tampered, for example, and the rightful owner of the electronic coupon confirms it. After that, the coupon issuance/management server changes the owner identification information. It is thereby possible to certainly prevent unauthorized uses of electronic coupons, and improve safety of electronic transactions using electronic coupons.

The coupon issuance/management server may set a term of validity of the electronic coupon, and record and manage information on the term of validity as a part of the coupon management information in the transfer management memory. If a relatively short term is set as the term of validity, it is possible to limit occurring damage to the minimum even when the information terminal holding the electronic coupon is lost or stolen. It is desirable that the information on the term of validity is included in information on the electronic coupon itself, and the information terminal can display the information on the display unit.

The coupon issuance/management server may record and manage information (hereinafter referred as progress information) on a status of progress of issuance and transfer of the electronic coupon as a part of the coupon management information in the transfer management memory, and carry out a process according to the progress information. It is thereby possible to resume the transferring process on the electronic coupon in the course of it.

The coupon issuance/management server may read the coupon management information from the transfer management memory when receiving a transfer notice, and carry out a charging procedure for charging an amount corresponding to the pecuniary value information to the user of an information terminal which is a transferor identified by the owner identification information. It is thereby possible to charge (bill) a use charge to the user of an information terminal to which the electronic coupon has been issued, with transfer of the electronic coupon as an opportunity.

In which case, the coupon issuance/management server may generate charge information on an amount corresponding to the pecuniary value information and accumulate it in the charge information memory, periodically read the charge information from the charge information memory and totalize it (sum up charge amounts), thereby periodically carrying out the charging procedure. It is thus possible to certainly collect use charges of the electronic coupons at one time. For the user, this is convenient because there is no need to make payment for each use (transfer) of the electronic coupon, for example.

When receiving a value conversion notice with respect to the electronic coupon from the information terminal, the coupon issuance/management server may reduce an amount corresponding to the pecuniary information of the electronic coupon from the charge information in the charge information memory. When the reduced charge information is negative, the coupon issuance/management server may transfer an amount corresponding to the charge information to the user of an information terminal identified by the owner identification information.

As above, when the user of the information terminal sends a value conversion notice with respect to an electronic coupon not used in any electronic transaction to the coupon issuance/management server, the user can cash the electronic coupon held in the information terminal and get an amount corresponding to the pecuniary value information of the electronic coupon. This can improve the convenience of the electronic coupons.

The information terminal can hold the electronic coupon in a terminal-side memory to which an access is inhibited or allowed by inputting password information, and inhibit an access (the transferring process, the value conversion notifying process, etc. on the electronic coupon) to the electronic coupon by inputting the password information. It is thus possible to largely improve the safety of the electronic coupon management in the information terminal. Since the password information to be inputted to the information terminal is information for allowing/inhibiting an access to the electronic coupon, not information relating to the electronic transaction, no damage will occur in the electronic transaction even if a third party steals a glance at the password inputting operation.

Practically, it is preferable that the electronic coupon is held in an IC card to which an access is inhibited by inputting a PIN (Personal Identifier Number) as the password information, and allowed an access by inputting a PIN block as the password information. It is thereby possible to further improve the security in management of the electronic coupon in the information terminal.

The information terminal may record and manage information about a status of progress of transfer of the electronic coupon in a terminal-side memory, and display the information on the displaying means. Whereby, the user can easily recognize whether the possessed electronic coupon has been transferred (used) or not, for example.

BRIEF DESCRIPTION OF DRAWINGS

FIG. 6 is a diagram showing an example of a transfer management table according to the embodiment;

DETAILED DESCRIPTION OF THE INVENTION (A) Description of an Embodiment

Figure 1:
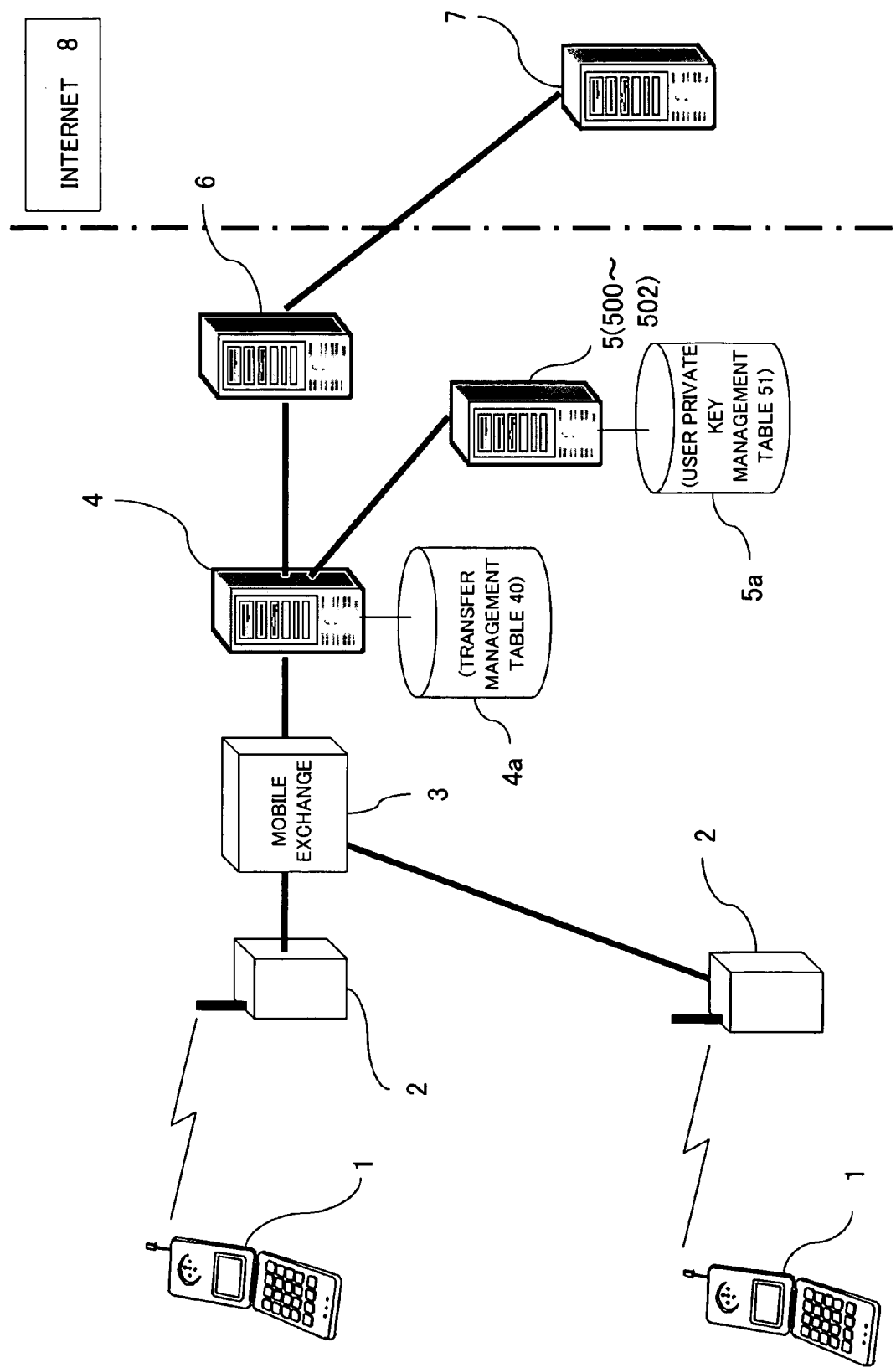
FIG. 1 is a block diagram showing a structure of an essential part of an electronic transaction system according to an embodiment of this invention.

FIG. 1 is a block diagram showing a structure of an essential part of an electronic transaction system according to an embodiment of this invention. The electronic transaction system shown in FIG. 1 comprises, for example, an information terminal 1 such as a cellular phone, a PDA (Personal Digital Assistance) or the like having a data communication function which can access to a mobile communication network and the Internet, a plurality of base stations 2 communicating with the information terminal 1 (portable terminal) (hereinafter referred simply as "terminal 1") within the communication zone to transmit/receive data (voice, image and the like), a mobile exchange 3 accommodating these base stations 2 to carry out a switching process on the data, a coupon management server 4 [(issuing) managing apparatus] communicably connected to the mobile exchange 3 to manage information about issuance, transfer and the like of an electronic signature coupon (to be described later) in a storage 4*a*, a PKI (Personal Key Infrastructure) operation server 5 communicably connected to the coupon management server 4 and having an electronic signature function using private key information managed in a storage 5*a*, a gateway server (gateway apparatus) 6 communicably connected to the coupon management server 4 to provide a gateway function with the Internet 8, and an EC server 7 opening an electronic shop site on the Internet 8 to operate and manage it.

The terminal 1 can access to the electronic shop site (hereinafter referred as an electronic shop 7, occasionally) on the Internet 8 operated and managed by the EC server 7 by accessing to the EC server 7 via the base station 2, the mobile exchange 3, the coupon management server 4 and the gateway server 6. By dialing a special number or the like of "coupon issuance service," the terminal 1 can access to the coupon management server 4 via the base station 2 and the mobile exchange 3.

The base stations 2, the mobile exchange 3, the coupon management server 4, the PKI operation server 5 and the gateway server 6 constitute a mobile carrier network. Generally, communication over lines whose network security is ensured is carried out between the terminal 1 and the gateway server 6 by peer to peer connection, and encryption communication using SSL, TLS or the like is carried out between the gateway server 6 and the EC server 7 on the Internet 8.

Figure 2:
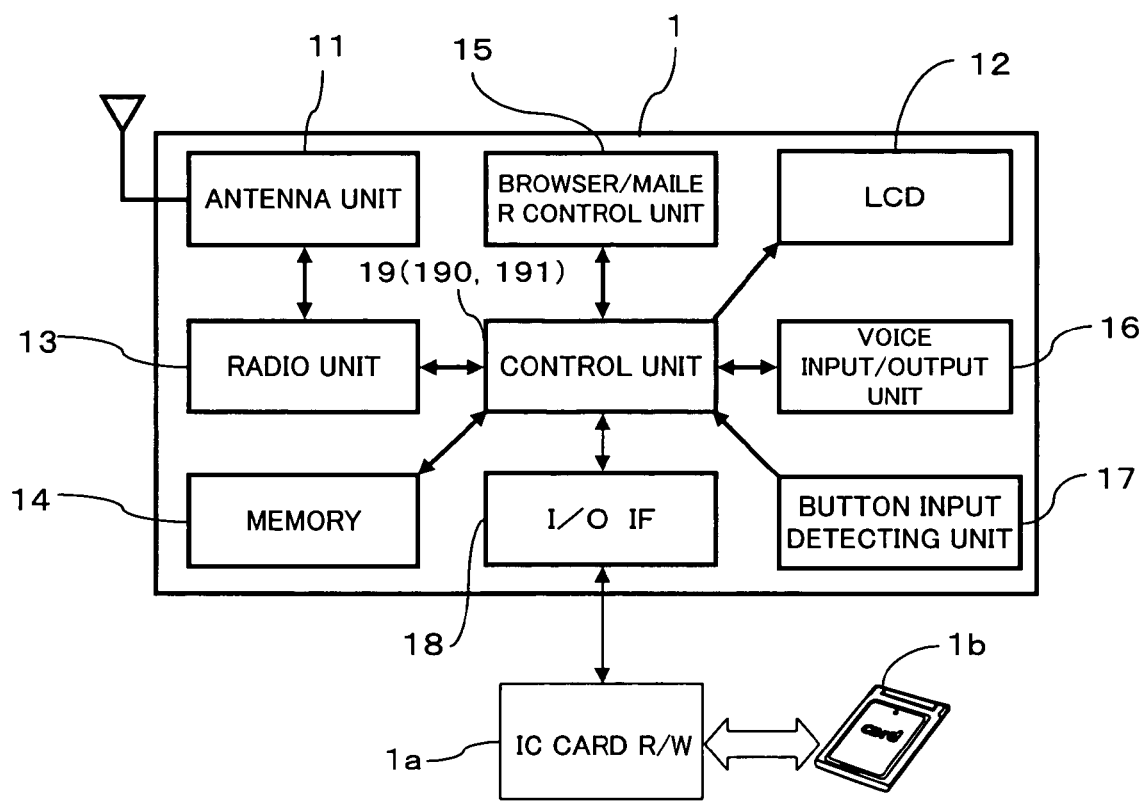
FIG. 2 is a block diagram showing a structure of an essential part of an information terminal according to the embodiment.

When focused on an essential part of the terminal 1, the terminal 1 according to this embodiment comprises, as shown in FIG. 2, an antenna unit 11, a liquid crystal display (LCD), a radio unit 13, a main memory 14, a browser/mailer control unit 15, a voice input/output unit 16, a button input detecting unit 17, an input/output interface (I/O IF) 18, and a control unit 19, etc.

The antenna unit 11 transmits and receives voice data at the time of voice call, an electronic mail at the time of data communication, web data in HTML (Hyper Text Markup Language) form, etc., over a radio line. The liquid crystal display (displaying means) 12 can display various things such as a menu according to its function, the above web data, an electronic mail (hereinafter referred simply as a mail, occasionally) and the like, and status of an originating call/incoming call.

The radio unit 13 has a transmitting/receiving process function of sending radio signals obtained by modulating a carrier wave with transmission data (voice, web data, electronic mail data, an electronic signature coupon or the like) to the base station 2 through the antenna unit 11, and demodulating radio signals from the base station 2 received by the antenna unit 11 to obtain various data such as voice, web data, electronic mail data, electronic signature data and the like.

The antenna unit 11 and the radio unit 13 fulfill a function as an electronic coupon receiving means for receiving an electronic signature coupon issued by the coupon management server 4 and the PKI operation server 5 in response to a request for coupon issuance from its own terminal, as will be described later.

The main memory 14 (hereinafter simply abbreviated as a memory 14) holds application data required by the terminal 1 for its operation, electronic mail data, web data obtained by browsing the Internet [by accessing to URL (Uniform Resource Locator)], etc. The browser/mailer control unit 15 controls Internet browsing, electronic mail transmission/reception (data communication), and the like. The browser/mailer control unit 15 is also equipped with a communication function using a required encryption protocol such as SSL, TLS, or the like.

The voice input/output unit 16 is a unit for inputting/outputting voice at the time of voice call, which is constituted with a microphone, a speaker, etc., for example. The button input detecting unit 17 detects various button operations of a power/call button, a disconnect/hold button, a cursor button, a decide button, a ten-key operation unit, etc. According to this embodiment, when the button input detecting unit 17 detects a calling operation to a special number connected to the coupon management server 4, for example, an electronic signature coupon issuance request (message) is produced by the control unit 19, and transmitted through the radio unit 13 and the antenna unit 11.

The input/output interface 18 interfaces with a device externally attached to the terminal 1. According to this embodiment, for example, an IC card reader/writer (R/W) 1a can be connected to the input/output interface 18 to store received various data ("an electronic coupon" and the like to be described later) in an IC card 1b (or referred as "a smart card"), as shown in FIG. 2.

The control unit 19 has general control on the above units 11 through 18 to intensively control the whole operation of the terminal 1. According to this embodiment, the control unit 19 has a function as a coupon issuance requesting means 190 for requesting the coupon management server 4 to issue an electronic signature coupon, and a function as a record/display controlling means that can record information on a status of progress of transfer of an electronic signature coupon (coupon status; provisionally transferred, transferred, during communication, etc.) in a memory 14 (or the IC card 1b) as a terminal-side memory and manage it, and read out the recorded contents and display them on the LCD 12. The control unit 19 is realized with a CPU (Central Processing Unit), for example.

The coupon management server 4 receives an issuance request message for an electronic signature coupon from the terminal 1, issues "an electronic signature coupon" having pecuniary value information usable in settlement of an electronic transaction on the basis of the message, and manages information on an owner of "the electronic signature coupon" and the like as a transfer management table 40 (to be described later with reference to FIG. 6) in the storage 4a such as a hard disk or the like. The PKI operation server 5 has a function (an electronic signature means 500) of affixing electronic signatures on "coupon information" sent from the coupon management server 4 to produce "an electronic signature coupon."

Figure 5:
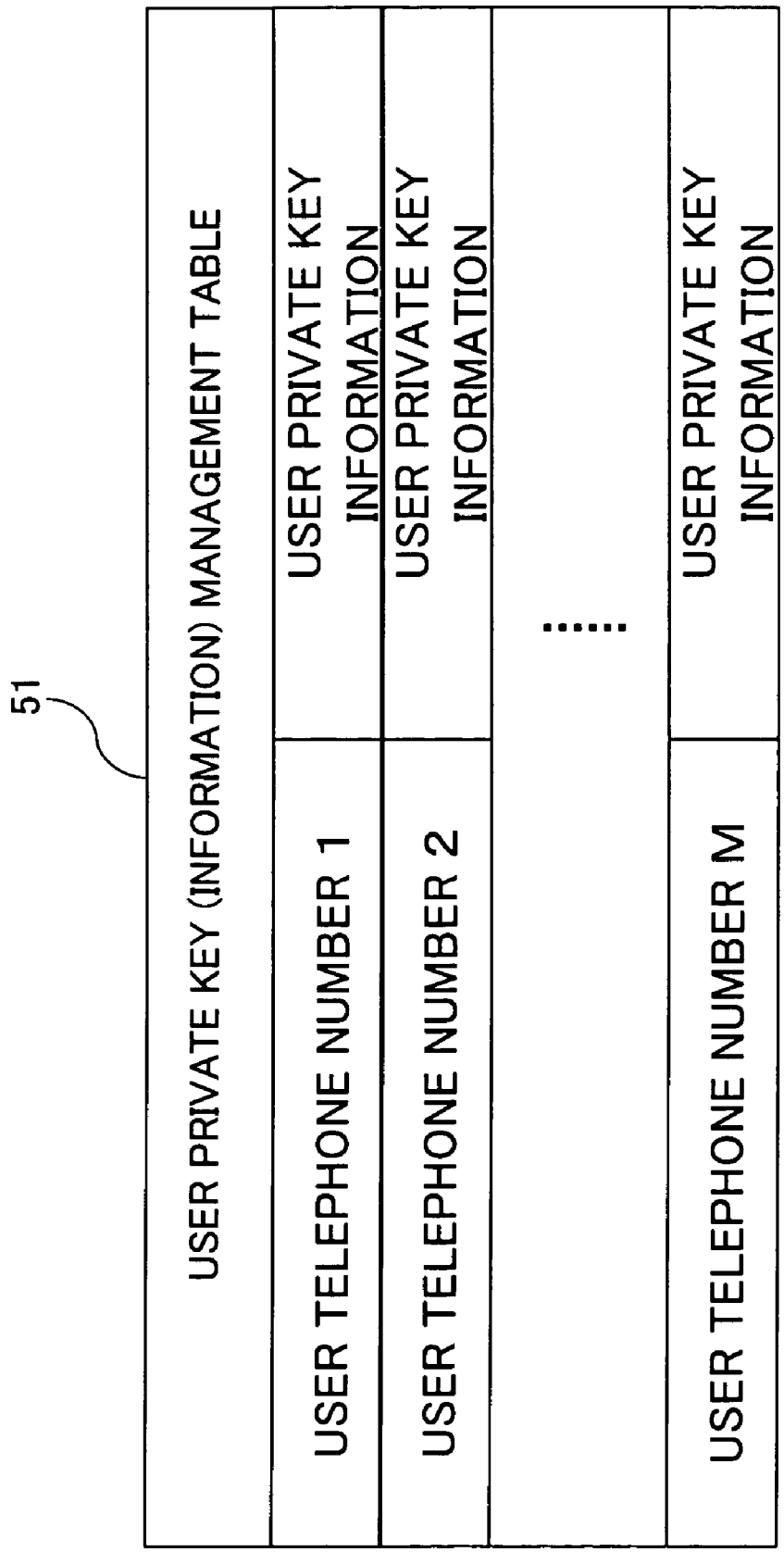
FIG. 5 is a diagram showing an example of a user private key (information) management table according to the embodiment.

As shown in FIG. 5, for example, the PKI operation server 5 holds and manages user private key information (hereinafter referred simply as a user private key) on each telephone number of the terminal 1 having been subscribed for "a coupon issuance service" as a user private key (information) management table 51 in a storage 5a such as a hard disk or the like. The user private key is set for each terminal 1 when the terminal 1 subscribes (contracts) for "the coupon issuance service."

Figure 3:
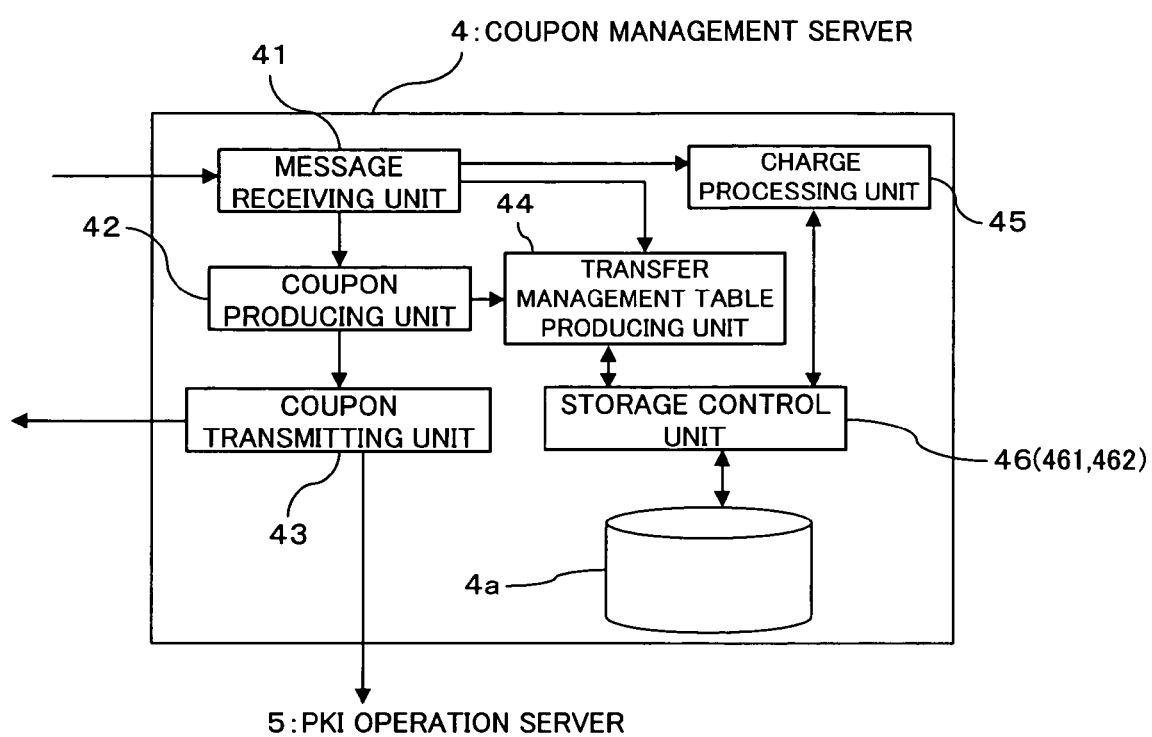
FIG. 3 is a block diagram showing a structure of an essential part of a coupon management server according to the embodiment.

The coupon management server 4 comprises, as shown in FIG. 3, for example, a message receiving unit 41, a coupon producing unit 42, a coupon transmitting unit 43, a transfer management table producing unit 44, a charge processing unit 45 and a storage control unit 46.

The message receiving unit 41 receives various messages such as a coupon issuance request (demand) message, a request for transfer of "an electronic signature coupon", etc. from the terminal 1. The coupon producing unit 42 produces "coupon information" having "administrator information" [a coupon number, pecuniary value information, management information (an issuing server name, issuance date and time, an administrator private key number), etc.] and "user information" [a coupon number, user information (a telephone number, a user private key number), etc.], for example.

The coupon transmitting unit 43 transmits "coupon information" produced by the coupon producing unit 42 to the PKI operation server 5 in order to affix electronic signatures, receives "the coupon information" ("the electronic signature coupon") on which electronic signatures have been affixed by the PKI server 5 and transmits "the electronic signature coupon" to the terminal 1, which has requested issuance of it.

The PKI operation server 5 that has received "the coupon information" from the coupon management server 4 encrypts administrator information 22 and user information 24 of "the coupon information" with "an administrator private key" characteristic of the coupon management server 4 and "a user private key" characteristic of an issuance requester (terminal 1) respectively, to generate signature data (server signature) 23 with "the administrator private key" and signature data (user signature) 25 with "the user private key," and adds them as the electronic signatures 23 and 25 to the administrator information 22 and the user information 24 of "the coupon information," respectively, to generate an electronic signature coupon 21 affixed the electronic signatures thereon with different private keys.

Concretely, the PKI operation server 5 retrieves "the user private key" corresponding to "a telephone number" included in the user information received from the coupon management server 4 in the user private key table 51, and affixes the electronic signature 25 with "the user private key" obtained as above. "The server private key" may be received from the coupon management server 4, or one beforehand registered in the storage 5a may be used as "the server private key."

Namely, the PKI operation server 5 (an electronic signature means 500) has a server private key signature means 501 (refer to FIG. 1) affixing an electronic signature 23 on "coupon information" (an electronic coupon) with a server private key characteristic of the PKI operation server 5 with respect to the pecuniary value information, and a user private key signature means 502 (refer to FIG. 1) affixing an electronic signature 25 on "coupon information" with a user private key characteristic of a user of the terminal 1 with respect to the owner identification information. Together with the coupon producing unit 42 and the coupon transmitting unit 43 in the coupon management server 4, the PKI operation server 5 configures a coupon issuing means which issues a coupon 21 to the terminal 1.

The transfer management table producing unit 44 produces various information such as a term of validity, a coupon status (issued, provisionally transferred, transferred, during communication, etc.), an issuance requester (for example, a telephone number, a shop number, etc.), a transferee [transferee (owner) identification information; for example, a telephone number, a shop number, etc.], a transfer number, etc. for each issued electronic signature coupon 21 [coupon (identification) number] as the transfer management table 40, as shown in FIG. 6.

The charge processing unit 45 has a function of receiving a transfer notice or a transfer completion notice with respect to the electronic signature coupon 21 to produce or totalize charge information according to "the value information" of the coupon 21, and issuing a bill in order to collect coupon use charges on the basis of the charge information. The storage control unit 46 can access to the storage 4a to retrieve, record (write), read information, and so forth. The storage control unit 46 can accumulate "the charge information" on each user (telephone number) in the storage 4a, register the transfer management table 40 produced by the transfer management table producing unit 44 in the storage 4a, and rewrite contents of the coupon 21 notified by the transfer notice or the transfer completion notice according to its transferee (the electronic shop 7, other terminal 1, or something).

Namely, the storage controlling unit 46 fulfils a function as a coupon owner changing means rewriting (changing) transferee (owner) identification information in the transfer management table 40 according to an apparatus (the EC server 7 or other terminal 1) to which the coupon 21 has been transferred. The storage 4a has both a function as a transfer management memory which records "the coupon management information" and a function as a charge information memory which can accumulate information (charge information) about charges (the service use charges) for using the electronic signature coupons. Note that these functions may be realized with respective exclusive memories, of course.

As stated above, the coupon management server 4 and the PKI operation server 5 according to this embodiment fulfill a function as a coupon issuance/management server that issues an electronic signature coupon 21 having "pecuniary value information" (hereinafter referred simply as "value information," occasionally) usable in a settlement in an electronic transaction, and manages an owner of the electronic signature coupon 21.

Hereinafter, detailed description will be made of operations of the electronic transaction system structured as above, which uses the electronic signature coupon 21, according to this embodiment.

(A1) Electronic Signature Coupon Issuing Process

First, description will be made of an issuing process of the electronic signature coupon 21. Assuming here that the IC card R/W 1a (refer to FIG. 2) is connected to the terminal 1, and an IC card 1b inserted into the IC card R/W 1a stores the electronic signature coupon 21.

The user of the terminal 1 enters PIN (Personal Identification Number) information, which allows reading/writing (an access), into the IC card 1b inserted in the IC card R/W 1a via the terminal 1 (step A1). In this state, the user dials on the terminal to call a special number or the like for electronic signature coupon issuance service in order to request issuance of the electronic signature coupon 21.

Figure 7:
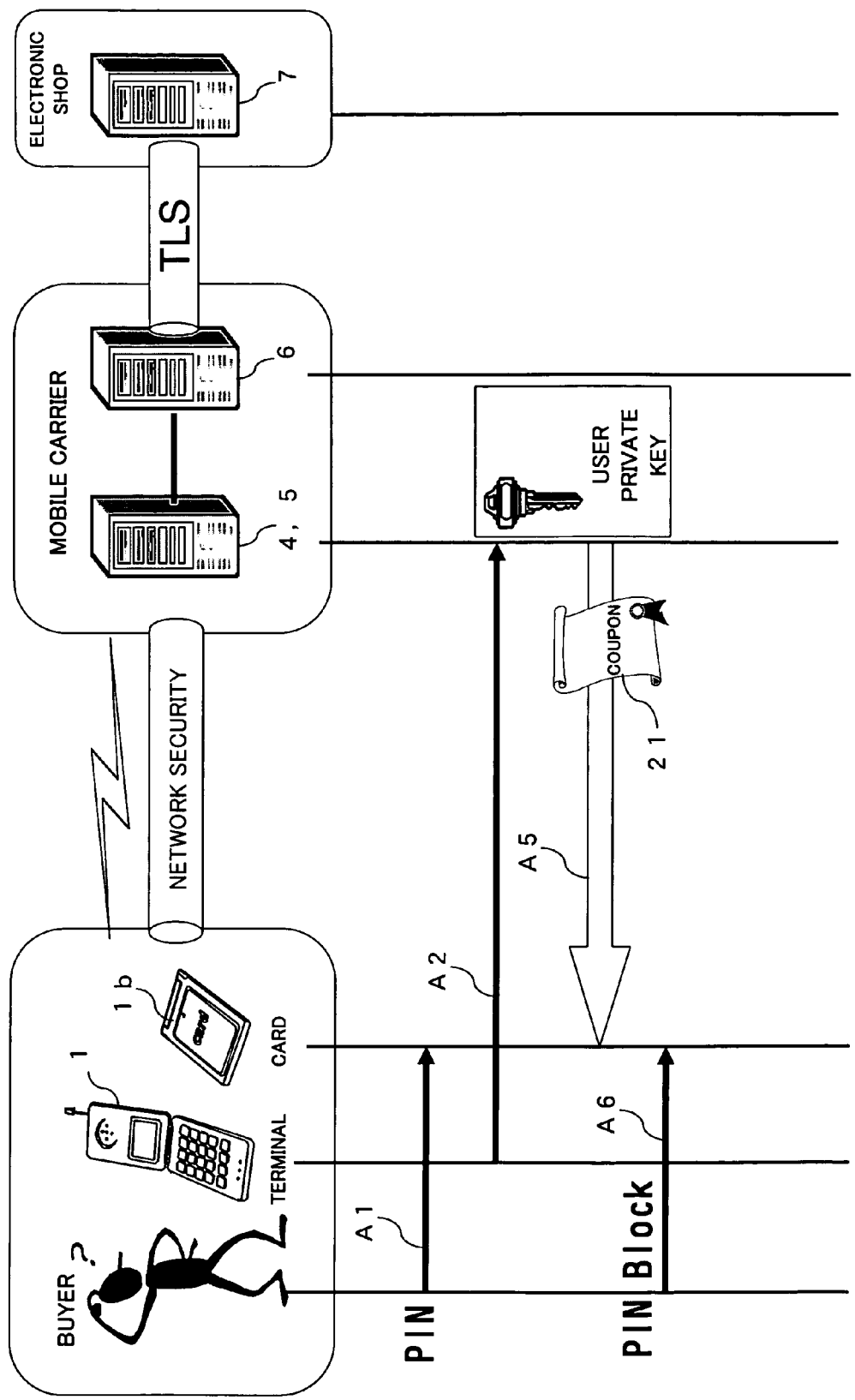
FIG. 7 is a sequence diagram for illustrating a coupon issuing process in the electronic transaction system according to the embodiment.
Figure 8:
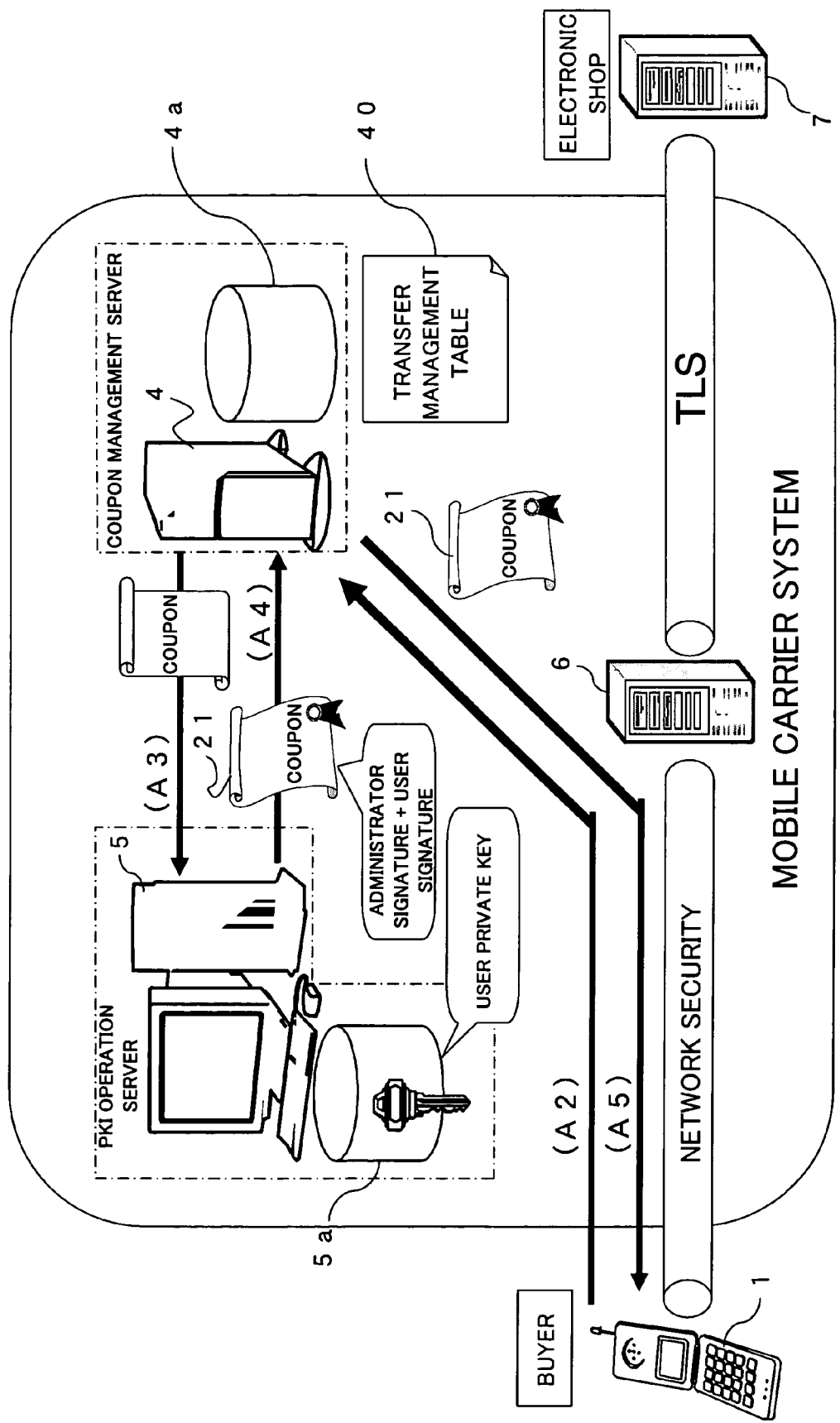
FIG. 8 is a sequence diagram for illustrating the coupon issuing process in the electronic transaction system according to the embodiment.

As shown in FIGS. 7 and 8, this call is received by the coupon management server 4 in the switching process of the mobile exchange 3. At this time, identification information (for example, a telephone number; first information) on the terminal 1 is automatically notified as additional information to the coupon management server 4 from the terminal 1 by an originating number notification setting or the like thereof (step A2).

Figure 4:
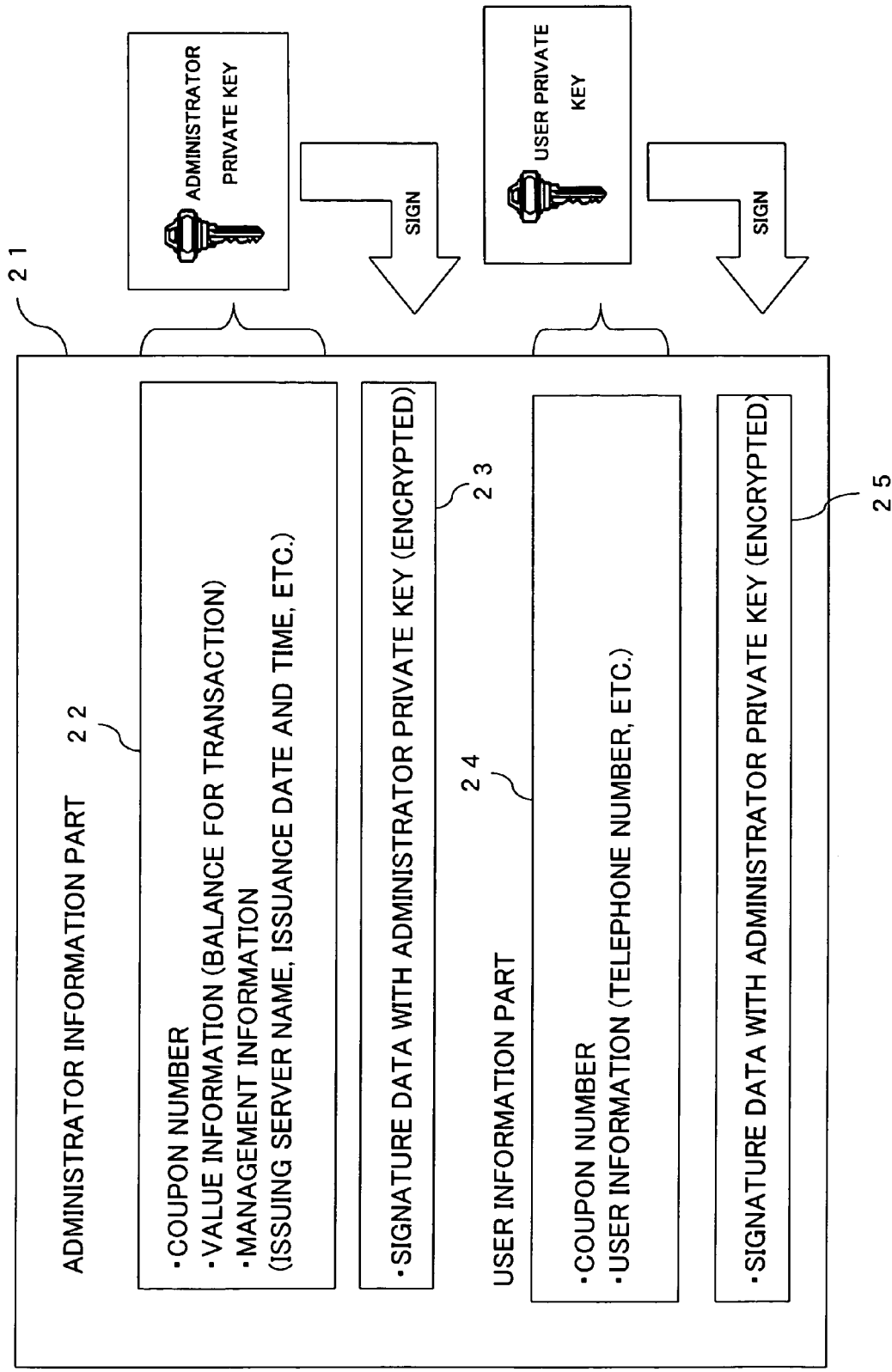
FIG. 4 is a diagram showing an example of contents of information of an electronic signature coupon according to the embodiment.

The coupon management server 4 sends coupon information including the administrator information 22 (a coupon number, value information, management information) and the user information 24 (a coupon number, user information) (refer to FIG. 4) to the PKI operation server 5, and makes "a request for signature" (step A3). "The coupon number" is identification information (third information) on the coupon (value information). The coupon management server 4 selects (assigns) a piece of identification information differing from coupon to coupon (assuming here that the coupon number of this time is "001").

As "the value information" (second information representing a value), selected is a value corresponding to data transmitted from the terminal 1 in response to an inputting operation detected by the button input detecting unit 17 of the terminal 1 (for example, when a number of "1000" is inputted to the terminal 1, "value information" is 1000 yen). More simply, it is alternatively possible to uniformly and fixedly set the value information to 1000 yen when a call from the terminal 1 is received. "The management information" includes own server name of the coupon management server 4 stored therein, and date and time of the incoming call outputted on the basis of a date/clock managing function of the coupon management server 4.

"The coupon number" included in the user information 24 is a coupon number identical to "the administrator information." "The user information" is identification information (here is used a telephone number) notified by the originating number notice or the like. When the administrator information 22 and the user identification information include the same item, either one of them may be used, not using the both. In the identification information of "the coupon information" (here is used a coupon number, for example), information other than the user information may be omitted and operated. In which case, it is preferable that "the value information" of "the coupon information" is a predetermined constant amount (balance for transaction). Electronic money may be employed as "the coupon information."

The PKI operation server 5 enciphers the administrator information 22 of the received coupon with the administrator private key and affixes the electronic signature 23 on "the coupon information," while enciphering the user information 24 with the user private key differing from the administrator private key and affixing the electronic signature 25 on "the coupon information."

The electronic signature coupon 21 (fourth information constituted with the second information and the third information) obtained as above is sent back to the coupon management server 4 (step A4). The coupon management server 4 sends the electronic signature coupon 21 by means of the coupon transmitting unit 43 to the terminal 1 that has requested issuance of the coupon (step A5). On the basis of the administrator information 22 and the user information 24 of the electronic signature coupon 21, the transfer management table producing unit 44 produces coupon management information (a coupon number, a term of validity, a status of coupon, an issuance requester, a transferee, a transfer number, etc.) The storage control unit 46 records the coupon management information as the transfer management table 40 in the storage 4a.

At this point of time, "the coupon number" is "001," "the term of validity" is, for example, "a date after one week from the incoming call," "the status of coupon" is "issued," "the issuance requester" is "telephone number of the terminal A," and "the transferee" is "not transferred." Producing and recording of the coupon management information may be done at a different timing during from when the call is received from the terminal 1 to when the coupon is transmitted to the terminal 1.

In the terminal 1, the received electronic signature coupon 21 is written in the IC card 1b by the IC card R/W 1a, and stored therein. Once the electronic signature coupon 21 is normally written, an access to the IC card 1b is inhibited by entering "a PIN block" to the IC card 1b (step A6 in FIG. 7). Whereby, the electronic signature coupon stored in the IC card 1b is prevented from reading by a third party.

Incidentally, "the PIN block" may be manually entered, or automatically entered by disconnecting the power of the terminal 1 or the IC card R/W 1a, or detaching the IC card R/W 3a from the terminal 1. When the electronic signature coupon 21 is transferred to the electronic shop 7 or another terminal 1, the PIN is inputted to allow an access to the IC card 1b, and the coupon 21 is read out from the IC card 1b and sent.

(A2) Coupon Transferring Process

Figure 9:
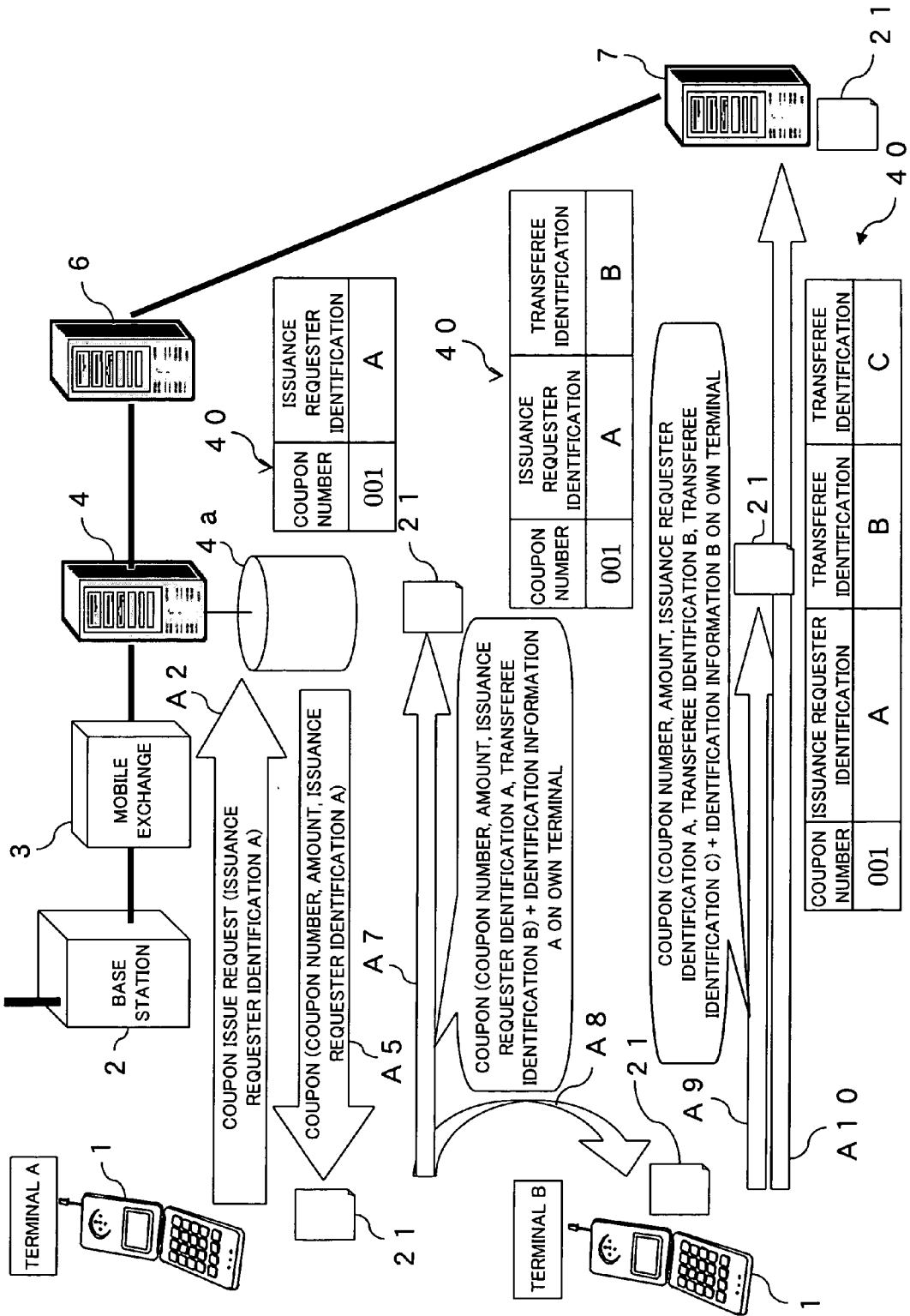
FIG. 9 is a diagram for illustrating a coupon transferring process in the electronic transaction system according to the embodiment.

Next, description will be made of a process carried out when the electronic signature coupon 21 is transferred to another terminal 1 or the electronic shop 7, with reference to FIG. 9. In the following description, a terminal 1 to which the electronic signature coupon 21 is issued is assumed to be a terminal A, and a terminal 1 to be transferred the coupon 21 from the terminal A is assumed to a terminal B as shown in FIG. 9, for the sake of convenience. When the coupon 21 is transmitted and received between the terminals A and B, a PIN/PIN block is always inputted to avoid an unauthorized access by a third party and information leakage to a third party, as described above.

The coupon 21 is issued to a user of the terminal A (steps A2 and A5), as above. Before that, the coupon management server 4 secures a storage area for a new coupon number "001" in the storage 4a (the transfer management table 40), as stated above. In this area, there is registered that the owner ("issuance requester") of the coupon 21 is the terminal A [concretely, a notified telephone number of the terminal A is registered as an issuance requester (owner identification information) A] Incidentally, the telephone number of the terminal A is also included as the user information in the coupon 21.

When the terminal A intends to transfer the coupon 21 to the terminal B in this state, the terminal A, as shown in FIG. 9, inputs information [transferee identification information B (here, a telephone number of the terminal B; fifth information, for example)] about a transferee of the coupon 21 by means of an inputting means such as the button input detecting unit 17 or the like to add it to the coupon 21, and sends it together with the identification information A on the terminal A to the coupon management server 4 using the originating number notifying function or the like (step A7). At the same time, the terminal A sends the coupon 21 to the terminal B using a transmitting function (an e-mail or the like) to transfer the coupon 21. It is desirable that the terminal A adds the same transfer number (here, "01") to the coupon 21 to be transmitted to the coupon management server 4 and the terminal B when transferring it, and transmits the same.

In the coupon management server 4, the message receiving unit 41 receives the coupon 21 as a coupon transfer notice, and the storage control unit 46 confirms that transfer requester identification information A of a coupon corresponding to the coupon number "001" in the transfer management table 40 coincides with the identification information A transmitted (notified) from the terminal 1 together with the received coupon 21, and writes "B" as a transferee and "01", for example, as "transfer number" in the transfer management table 40.

In this case, the storage control unit 46 functions as a terminal-to-terminal owner changing means 462 (refer to FIG. 3) which receives a notice that the coupon 21 is transferred from the terminal A to the terminal B, sets the terminal B as a transferee of the coupon number "001" in the transfer management table 40 to change information showing an owner of the coupon 21 to information characteristic of the terminal B.

Figure 10:
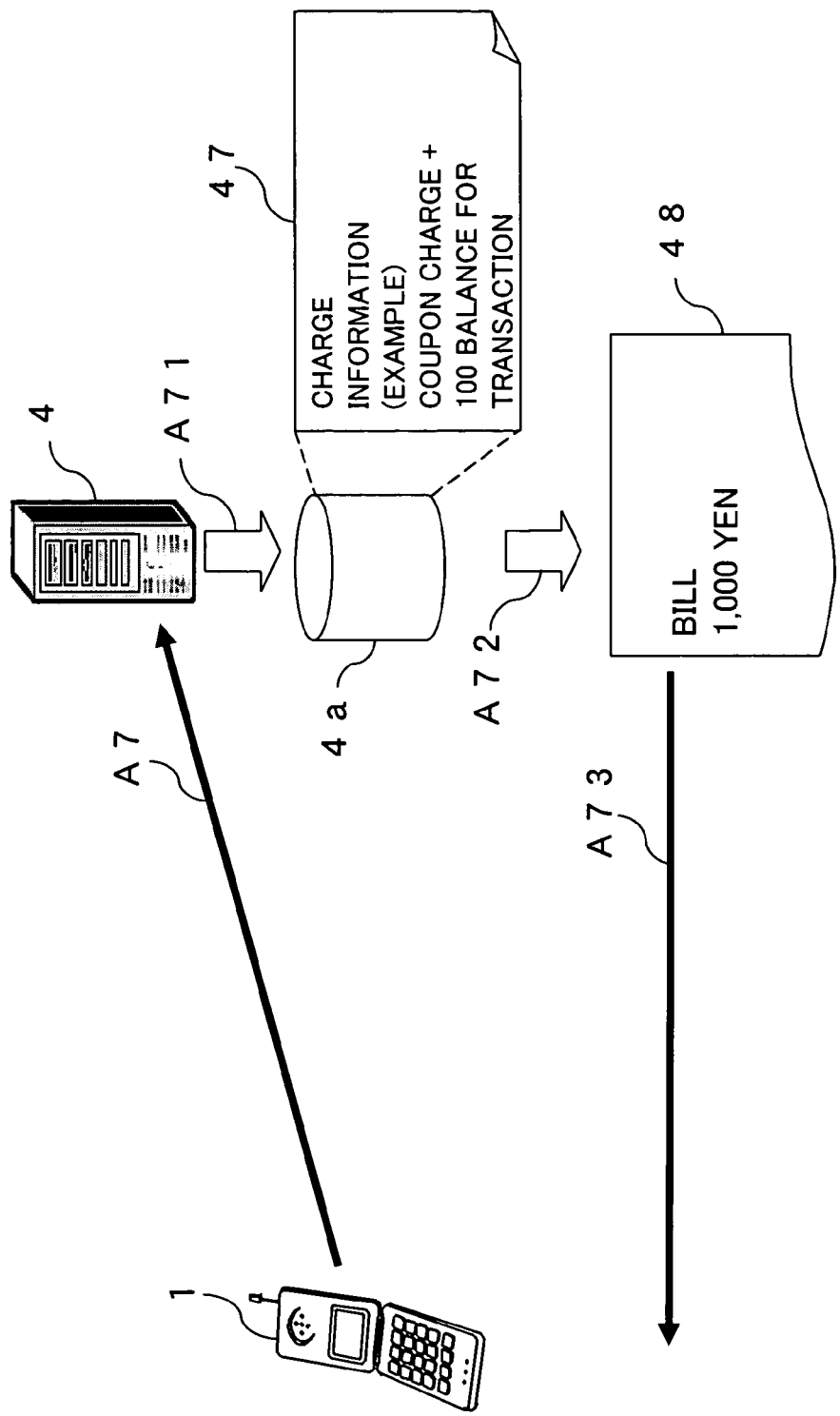
FIG. 10 is a diagram for illustrating a charging process in the electronic transaction system according to the embodiment.

At this time, the charge processing unit 45 generates charge information 47 corresponding to "value information" of the coupon 21 to the former owner (terminal A) who has requested issuance of the transferred coupon 21, and the storage control unit 46 accumulates it in the storage 4a, as shown in FIG. 10, for example (step A71).

The charge processing unit 45 totalizes the charge information 47 accumulated in the storage 4a periodically (once a month, for example), and periodically issues a bill 48 for the coupon use charges to the user of the terminal A (steps A72 and A73). Whereby, the coupon management server 4 can periodically collect the coupon use charges from the user of the terminal A. "The coupon use charge" may be included as an item in a bill for a monthly communication charge to the terminal A, for example.

When the user of the terminal B to which the coupon 21 has been transferred as above purchases an article or uses a service at the electronic shop 7 thereafter, the user of the terminal B can settle the payment in this electronic transaction by transferring the coupon 21 transferred from the terminal A to the electronic shop 7.

In this case, the user of the terminal B inputs information on a transferee of the coupon 21 [transferee identification information C (for example, a shop number of the electronic shop)] using an inputting means such as the button input detecting unit 17 or the like to add it to the coupon 21, and sends the coupon 21 together with the identification information B on the terminal B to the coupon management server 4 and the EC server 7, using the originating number notifying function or the like (steps A9 and A10).

In the coupon management server 4 having received the coupon 21, the storage control unit 46 writes "C" (identification information on the EC server 7) next to the transferee identification information "B" when the latest transferee identification information "B" of the coupon 21 corresponding to the coupon number "001" coincides with the identification information "B" sent (by the originating number notice) together with the coupon 21 in the transfer management table 40, and changes the owner of the coupon 21 from the terminal B to the electronic shop 7. In this case, the storage control unit 46 functions as a terminal-to-electronic shop owner changing means 461 (refer to FIG. 3) which, when receiving from the terminal B a notice that the coupon 21 is transferred from the terminal B to the electronic shop 7 in an electronic transaction at the electronic shop 7, changes the transferee of the coupon 21 of the coupon number "001" to the electronic shop 7 in the transfer management table 40, thereby to change information showing the owner of the coupon 21 to information characteristic of the electronic shop 7.

As a result, the electronic shop 7 becomes the owner of the coupon 21, and can settle the payment for an article purchased by the user of the terminal B on the basis of "value information" of the coupon 21. In other words, the electronic shop 7 can receive a transfer of an amount corresponding to "the value information" of the coupon 21 out of an amount collected as "the coupon use charge" from the terminal 1 to a designated account from the coupon management server 4. This transferring process is carried out by transmitting the coupon 21 together with the identification information (sixth information) on the server 7 from the electronic shop 7 to the coupon management server 4. At the time of this transmission, the storage control unit 46 of the coupon management server 4 determines whether or not the latest transferee identification information (fifth information) corresponding to a coupon number (third information) included in the received coupon 21 coincides with the identification information (sixth information) on the EC server 7 sent together with the coupon 21.

Namely, the storage control unit 46 according to this embodiment has a function as a determining means which, when receiving a coupon number (third information) and identification information (sixth information) on the electronic shop 7 from the electronic shop 7 (like the terminal B) which is as a terminal differing from the terminal A, determines whether or not the identification information coincides with transferee identification information related to the coupon number stored in the storage 4a (the transfer management table 40), and determines that the electronic shop 7 is valid as the owner of the coupon 21 when they coincide with each other, or determines that the electronic shop 7 is not valid when they do not coincide.

When it is found as a result of the above determination that they do not coincide with each other, the charge processing unit 45 does not carry out the transferring process, and a coupon owner error is notified to the electronic shop 7. When they coincide with each other, the coupon management server 4 transmits the coupon 21 to the PKI operation server 5. The PKI operation server 5 compares results obtained by encrypting the administrator information 22 and the user information 24 of the coupon 21 with the administrator private key and the user private key, respectively, with the signature data obtained with the administrator private key and the signature data 25 obtained with the user private key included in the coupon 21, and transmits a result of the comparison (agreement/disagreement) to the coupon management server 4.

Even when the value information of the administrator information 22 is illegally tampered, it is possible to find the tampering because it does not coincide with the signature data 23. Since the signature data 23 and 25 are encrypted with the respective private keys, it is basically impossible to rewrite their contents. When the result of the above comparison from the PKI operation server 5 is "agreement," the coupon management server 4 transfers an amount determined according to the value information included in the administrator information 22 to a designated account or the like of the electronic shop 7. When the result is "disagreement," the coupon management server 4 notifies the electronic shop 7 that the coupon data is illegal.

The above example is a case where the user of the terminal B to which the coupon 21 has been transferred from the terminal A uses the coupon 21 in an electronic transaction with the electronic shop 7. When the user of the terminal A who has requested issuance of the coupon 21 uses the coupon 21 in an electronic transaction with the electronic shop 7, the user of the terminal A transfers the coupon 21 to the electronic shop 7 in the similar way to the above, whereby settlement of payment in the electronic transaction can be done with the coupon 21, as a matter of course.

In each of the terminals A and B, information (progress information) equivalent to the transfer management table 40 in the coupon management server 4 is recorded and managed in the memory 14 (or the IC card 1b), and suitably displayed on the LCD 12. Whereby, the user can easily recognize information about whether the coupon 21 is not used (not transferred) or used (transferred), when the term of validation of the coupon 21 comes due, who is the transferee, who is the transferee if the coupon 21 has been used, etc.

According to this embodiment, it is possible to settle payment in an electronic transaction with an electronic shop only by issuing and circulating the coupon 21 on which signatures have been affixed with a user private key and an administrator (operation server) private key managed on the mobile carrier's side (the coupon management server 4, the PKI operation server 5) without notifying the electronic shop of a credit card number or the like. Whereby, it is possible to realize a simple electronic transaction settlement while preventing tampering or unauthorized use by a third party.

Even if the electronic shop 7 is opened by a third party not authorized by the certificate authority or the like, for example, safely settlements in electronic transactions are possible. The coupon management server 4 according to this embodiment properly manages a valid owner (a person who has a proper right) of an issued coupon 21 at all times according to transfer of the coupon 12 by a transfer notice from the person who has a proper right of the coupon 21, so that it is possible to avoid an unauthorized settlement in an electronic transaction.

It is more preferable that the coupon management server 4 has a valid coupon confirming function. For example, the terminal 1 possessing the coupon 21 transmits the coupon 21 and terminal identification information (for example, a telephone number) to the coupon management server 4, and requests the coupon management server 4 to make valid coupon confirmation. The coupon management server 4 reads the latest transferee identification information from the transfer management table 40 in which the transferee identification information is related with a coupon number included in the received coupon 21.

Determination on whether the transferee identification information is the latest or not is made in a way that transferee identification information is recorded in time series (for example, recorded with a number showing the order) in every transferring process in the transfer management table 40 in the transferring process on the coupon 21 (at the above step A2), whereby transferee identification information having the largest number is determined to be the latest transferee identification information, for example.

When the transferee identification information read out as above coincides with identification information received from the terminal 1, the coupon management server 4 notifies the terminal 1 of agreement of the owner. When they do not coincide, the coupon management server 4 notifies the terminal 1 of a coupon owner error.

A higher-degree of check on the coupon 21 is carried out in a way that, when detecting disagreement, the coupon management server 4 transmits the coupon 21 to the PKI operation server 5 to request the PKI operation server 5 to confirm the agreement/disagreement between the administrator information 22 and the user information 24, and the PKI operation server 5 sends back a result of it. The coupon management server 4 transfers a result (agreement/disagreement) notified from the PKI operation server 5 to the terminal 1. In such a way, it is possible to realize a higher-degree of check.

When the PKI operation server 5 detects disagreement, the coupon management server 4 further transmits the administrator information 22 having an updated coupon management number, and the user information 24 which is user information (a telephone number) applied terminal identification information (a telephone number) thereto received from the terminal 1 having requested valid coupon confirmation, to the PKI operation server 5. The PKI operation server 5 adds the signature data 23 and 25 encrypted with an administrator private key and a user private key to the administrator information 22 and the user information 24, respectively, and transmits the coupon 21 to the coupon management server 4.

The coupon management server 4 deletes data that is an object of the request for valid coupon confirmation in the transfer management table 40, and newly produces the transfer management table 40 with respect to the coupon 21 having the received coupon number. In other words, the coupon management server 4 sets the terminal 1 having made the valid coupon confirmation request as the coupon issuance requester. The term of validity of the coupon may be the same as the deleted data or may be a date described when the transfer management table 40 is produced. Preferably, the term of validity of the coupon is included in the administrator information 22, and is affixed a signature thereon in the PKI operation server 5.

Incidentally, since the administrator information 22, the user information 24 and the added transferee information not encrypted are displayed on the LCD 12 under the control of the control unit 19 in the terminal 1, the user of the terminal 1 can confirm the term of use, the transfer history, etc. of the coupon from this information.

Since the coupon 21 includes only the pecuniary value information (administrator information 22) and information (user information 24) about who is the owner/issuance requester and who is the transferee (present owner), it is possible to avoid a situation where a credit number or its password leaks and the user is greatly damaged thereby as before. Accordingly, it becomes possible to realize an easy, safe electronic transaction settlement on the Internet 8.

In the coupon 21, the electronic signatures 23 and 25 are affixed on the administrator information 22 and the user information 24 with different encryption keys (a server private key and a user private key) in the PKI operation server 5, so that information included in the coupon 21 can be effectively prevented from leaking to or tampered by a third party.

Even when the pecuniary value information in the user information 24 is tampered by the user or a third party, for example, the PKI operation server 5 can readily find it and invalidate the coupon 21 (for example, make the term of validity thereof zero), for example.

It is possible to change only the user information 24 or the administrator information 22. For example, the user information 24 can be changed to information on a transferee of the coupon 21 according to the transferee, or the administrator information 22 can be changed to new information with a change of the coupon management server 4.

According to this embodiment, the signing process on the coupon 21 is all executed by the PKI operation server 5 instead of the terminal 1, so that even the terminal having a low processing capability can use this system. Since private key information for signatures is all managed by the PKI operation server 5, operation such as update of the key information can be carried out inside the PKI operation server 5, thus the coupon management server 4 can get rid of labor such as rewriting of information for encryption (ID, key information) necessary in TLS or SSL communication.

The coupon management server 4 sets a term of validity to the coupon 21, records information on the term of validity as a part of the coupon management information in the transfer management table 40 and manages it. If the term of validity is set to a relatively short term, for example, it is possible to limit damage on the user to the minimum even when the terminal 1 holding the coupon 21 is lost or stolen. The above term of validity may be set according to a request from the terminal 1 when the coupon is issued.

The coupon management server 4 records a coupon status (progress information about issuance and transfer of the coupon 21 such as provisionally transferred, transferred, during communication, and so forth) as a part of the coupon management information in the transfer management table 40, and manages it. Even if a communication (radio) line is disconnected during transfer, for example, it is possible to reopen the transferring process on the coupon 21 in the middle course of it.

The coupon management server 4 reads the coupon management information from the transfer management table 40 in response to a transfer notice form the terminal A, and executes a charging procedure to charge an amount corresponding to the value information in the coupon 21 to a user of the terminal A identified as a transferor by the owner identification information. Taking transfer of the coupon 21 opportunity, it is possible to charge (bill) the use charge to the user of the terminal A to which the coupon 21 has been issued. Namely, the use charge is not charged to the terminal B to which the coupon 21 has been transferred or the electronic shop 7. Accordingly, it is possible to transfer the coupon 21 as a present or the like to the terminal B, for example.

In this case, the coupon management server 4 generates charge information of an amount corresponding to the pecuniary information of the coupon 21, and accumulates it in the storage 4a. The charge processing unit 45 periodically reads the accumulated charge information from the storage 4a, totalizes it, and periodically carries out the above charging procedure. It is thereby possible to certainly collect the use charge of the coupon 21, and this is convenient for the user because the user does not need to take a procedure or the like for payment each time the coupon 21 is used (transferred).

Since each of the terminals A and B holds the coupon 21 in the IC card 1b to which an access is allowed by inputting a PIN and is inhibited by inputting an PIN block, it is possible to largely improve the safety (security) in the coupon management in the terminals A and B. At this time, the PIN/PIN block to be inputted to the terminals A and B is information for allowing/inhibiting an access to the coupon 21, which has no relation with the electronic transaction. Even when a third party steals a glance at its inputting operation, no damage occurs in the electronic transaction.

(A3) Description of Modification of Coupon Transferring Process to Electronic Shop 7

Figure 11:
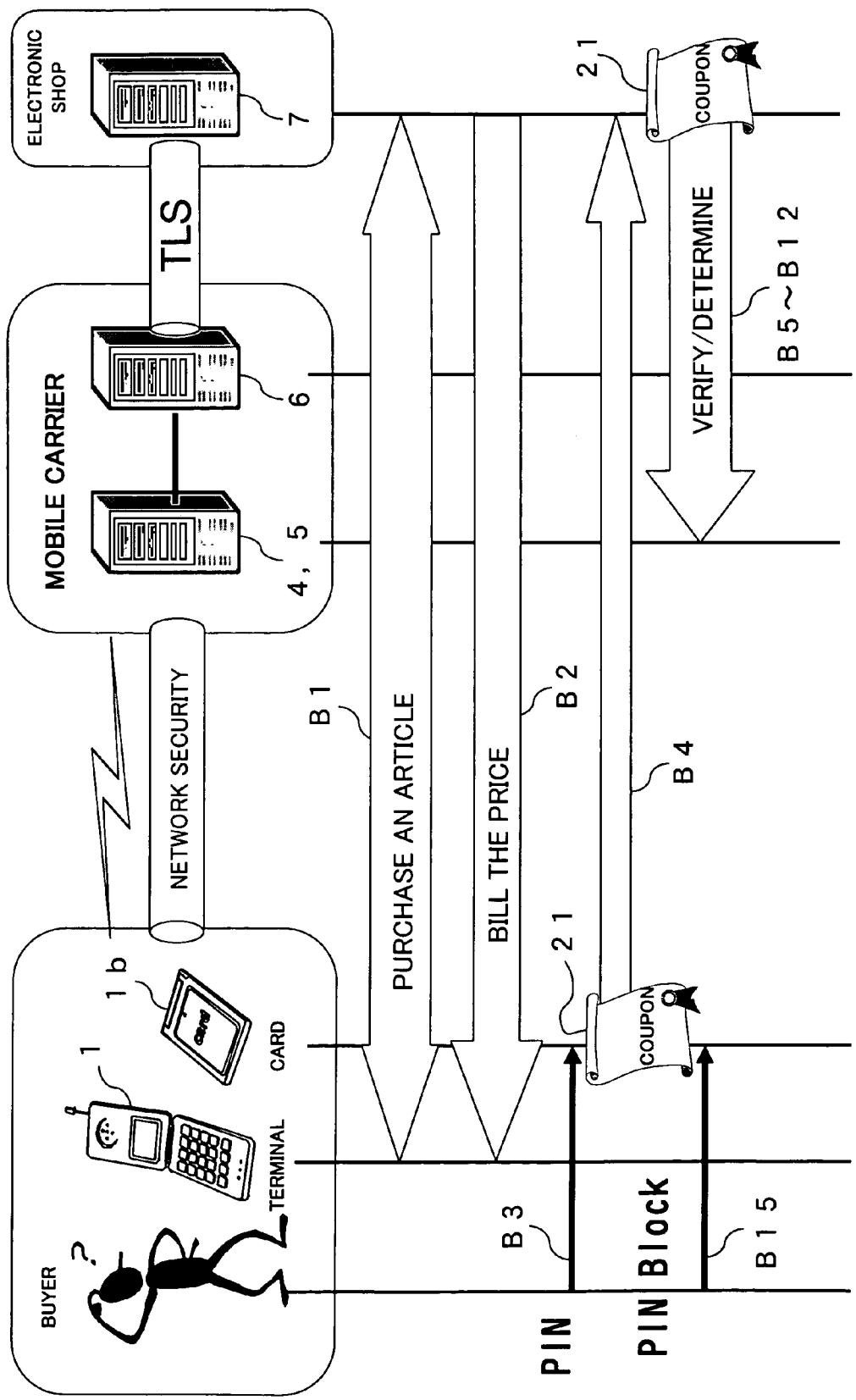
FIG. 11 is a sequence diagram for illustrating a modification of the coupon transferring process to an electronic shop in the electronic transaction system according to the embodiment.
Figure 12:
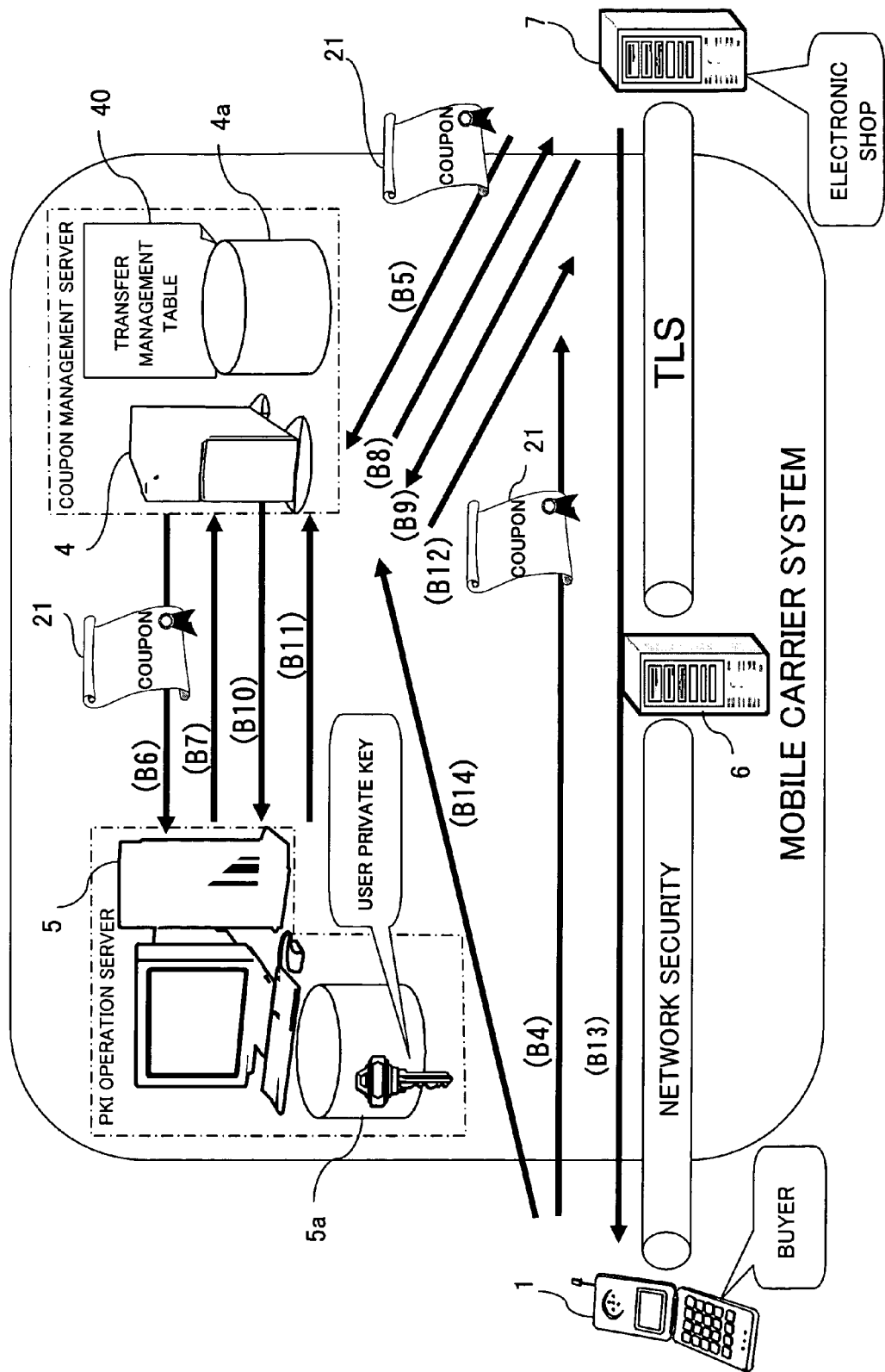
FIG. 12 is a sequence diagram for illustrating another modification of the coupon transferring process to the electronic shop in the electronic transaction system according to the embodiment.

Next, description will be made of a modification applied when the coupon 21 is transferred to the electronic shop 7, with reference to FIGS. 11 and 12. This transferring process is carried out when a user of the terminal 1 who has asked for issuance of the coupon 21 purchases an article or a service at the electronic shop 7.

The user of the terminal 1 purchases a certain article or service at the electronic shop 7 (step B1) A bill for the price in this transaction is issued from the electronic shop 7 to the terminal 1 (step B2). The user of the terminal 1 inputs a PIN from the terminal 1 through the IC card R/W 1a (step B3) to read the coupon 21 stored in the IC card 1b, then sends the coupon 21 to the electronic shop 7 (step B4). After sending the coupon 21, the user of the terminal 1 enters a PIN block to inhibit an access to the IC card 1b (step B15).

In order to confirm "validity" of the coupon 21, the electronic shop 7 sends the coupon 21 (copy) to the coupon management server 4 which is the issuer of the coupon 21 to request the coupon management server 4 to verify "the validity" of the coupon 21 (step B5). The coupon management server 4 sends the coupon 21 sent from the electronic shop 7 to the PKI operation server 5, and requests the PKI operation server 5 to verify the electronic signatures 23 and 25 (step B6). In response to it, the PKI operation server 5 decrypts the electronic signatures 23 and 25 of the received coupon 21 with a server private key and a user private key, respectively, and verifies whether or not administrator information 22 and user information 24 are tampered.

A result of the verification is sent from the PKI operation server 5 to the electronic shop 7 via the coupon management server 4 (steps B7 and B8). The electronic shop 7 requests the coupon management server 4 to transfer the coupon 21 when the "validity" of the coupon is confirmed as a result of the verification (step B9).

When receiving the transfer request, the coupon management server 4 changes "the coupon status" of the coupon 21 in the transfer management table 40 in the storage 4a to "the provisionally transferred" by means of the storage control unit 46, and registers "a shop number" of the electronic shop 7 as "the transferee." The coupon management server 4 generates a coupon number, a transferee, a transfer number, etc. as "transfer information," sends them to the PKI operation server 5, asks the PKI operation server 5 to encrypt "the transfer information" with a user private key, and sends encrypted "transfer information" obtained as above back to the electronic shop 7 (steps B10 to B12).

The electronic shop 7 transmits the encrypted "transfer information" as "settlement completion information" (transfer confirmation information) to the terminal 1 (step B13). In the terminal 1, the received "transfer information" is decrypted with the user private key by the browser/mailer control unit 15, then displayed on the LCD 12. The user of the terminal 1 confirms contents of the display (a coupon number, a transferee, a transfer number, etc.), then transmits the "transfer information" as "transfer completion notice" to the coupon management server 4 (step B14).

The coupon management server 4 confirms whether or not "the transfer completion notice" received from the terminal 1 is notified from the terminal 1 having a telephone number registered as "issuance requester" (owner identification information) in the transfer management table 40, thereby to confirm whether or not the received "transfer completion notice" is from a rightful person of the coupon 21, then changes "the coupon status" in the transfer management table 40 from "provisionally transferred" to "transferred."

At this point of time, the electronic shop 7 becomes the rightful person of the coupon 21. The coupon management server 4 accumulates the charge information 47 on the terminal 1 in the storage 4a, and carries out the bill issuing process for the coupon use charge by means of the charge processing unit 45 like the charging process (steps A71 to A73) described above with reference to FIG. 10. The electronic shop 7 makes a request or the like for money transfer to a designated bank account to the coupon management server 4, thereby receiving payment of an amount corresponding to "the value information" of the coupon 21 transferred from the terminal 1.

When "validity" of the coupon 21 is not confirmed as a result of the above confirmation in the PKI operation server 5, the coupon management server 4 makes the coupon 21 null and void (for example, makes the term of validity zero).

According to this modification, only after the validity of the coupon 21 is confirmed and the terminal A, a transferor, which is a rightful person of the coupon 21 is confirmed at that moment, transfer of the coupon 21 to the electronic shop 7 is completed (rewriting of the owner identification information in the coupon management server 4 is completed). Consequently, this modification can bring the same advantages, and can certainly prevent unauthorized use of the electronic coupon. Moreover, it is possible to largely improve safety of electronic transactions using the coupons 21.

(A4) Description of Modification of User-to-User (Terminal 1-to-Terminal 1) Coupon Transferring Process Next, description will be made of a process of transferring the coupon 21 between users (terminal 1), with reference to FIGS. 13 and 14. In the following description, assuming that a terminal 1 which requests issuance of the coupon 21 is terminal A, whereas another terminal 1 to be transferred the coupon 21 from the terminal A is terminal B. Accordingly, in the transfer management table 40 of the coupon management server 4, the coupon status of the coupon 2 having been issued to the terminal A is "not transferred," and the issuance requester (owner identification information) is the terminal A (a telephone number of the terminal A). In this case, unauthorized access from a third party and information leakage to a third party are prevented by always inputting a PIN/PIN block when the coupon 21 is transmitted and received between the terminals A and B, as well.

Figure 13:
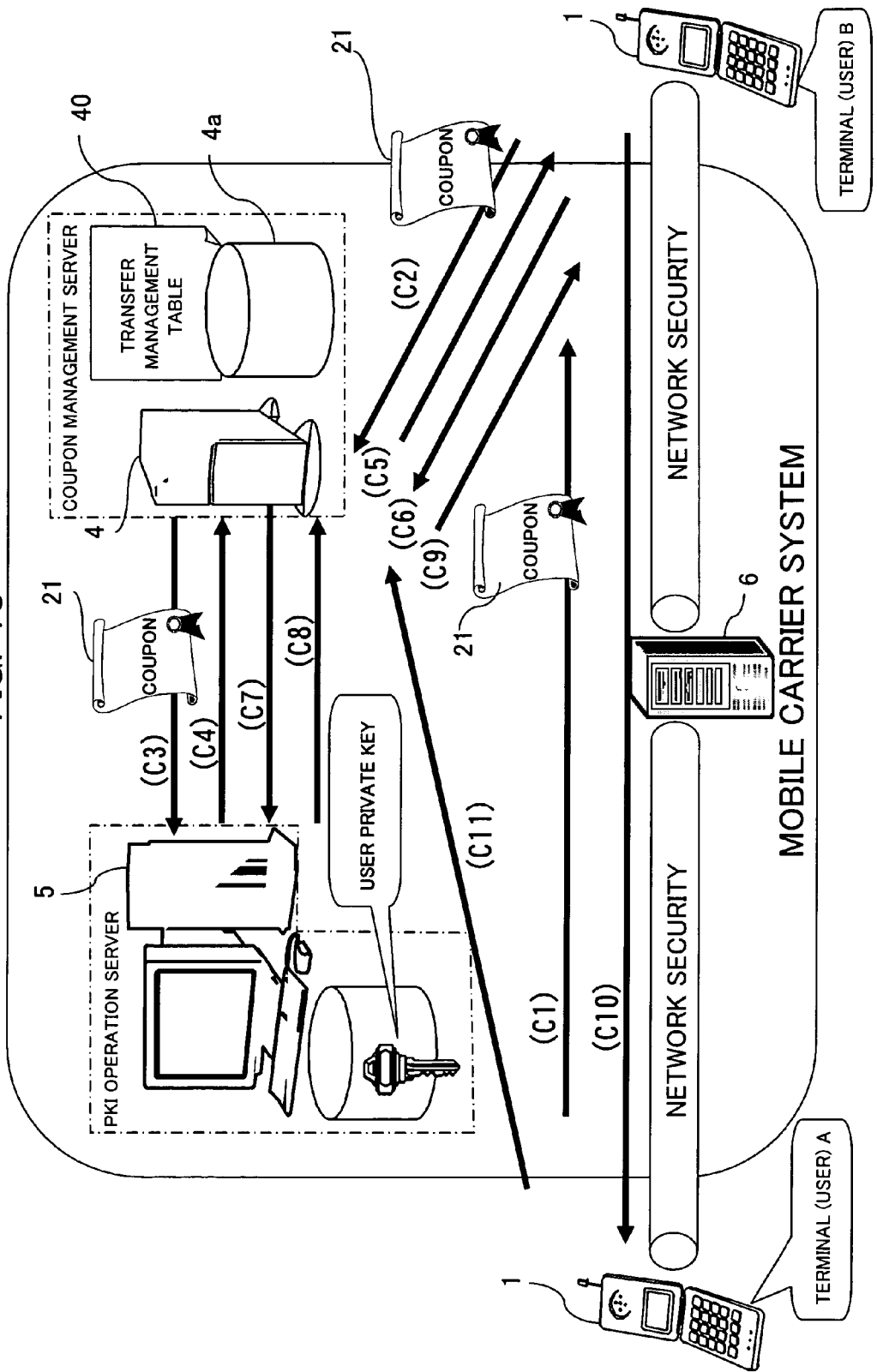
FIG. 13 is a sequence diagram for illustrating a modification of a user-to-user coupon transferring process in the electronic transaction system according to the embodiment.
Figure 14:
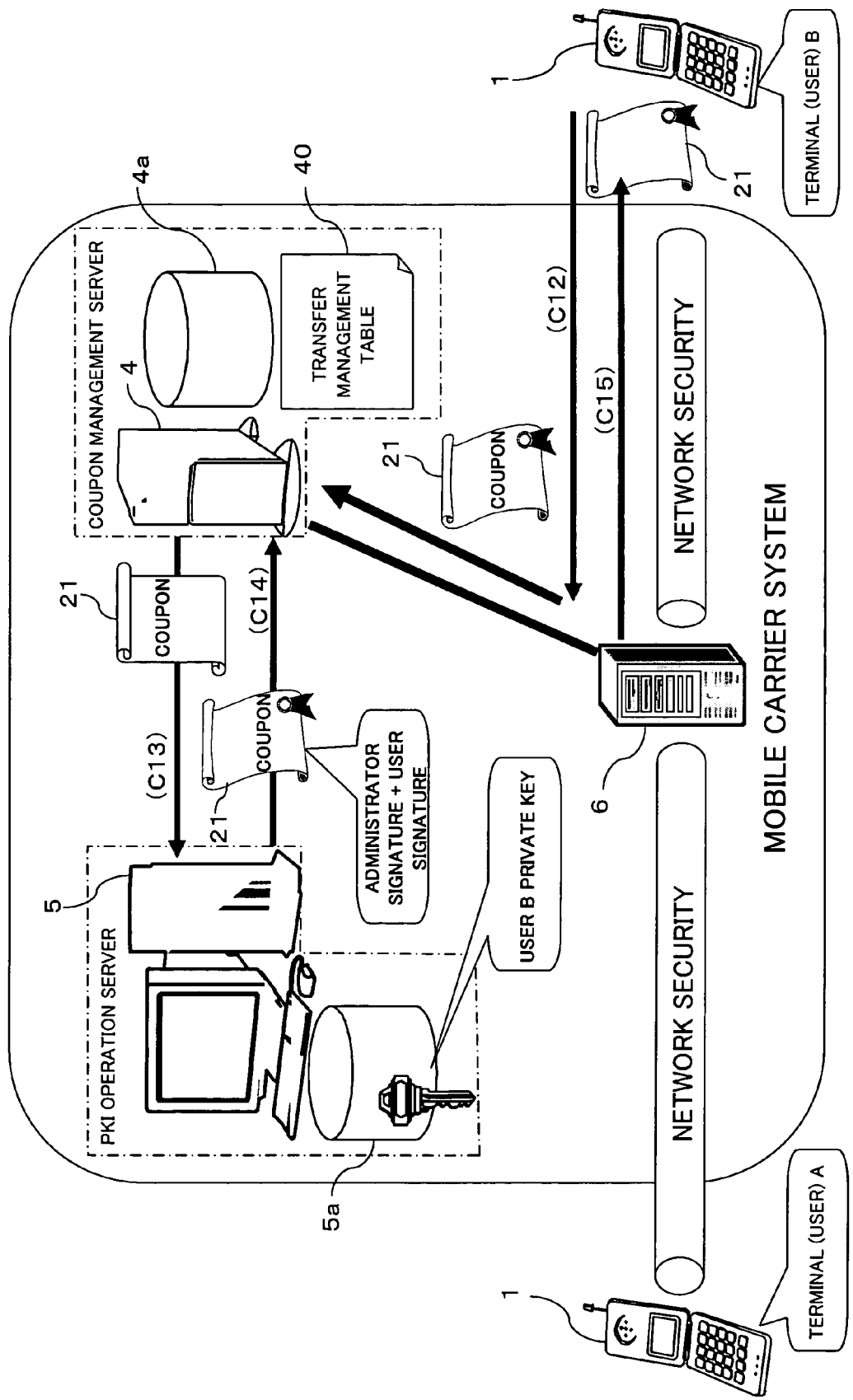
FIG. 14 is a sequence diagram for illustrating the modification of the user-to-user coupon transferring process in the electronic transaction system according to the embodiment.

The terminal A reads out the coupon 21 from the IC card 1b, and sends the coupon 21 to the terminal B (step C1), as shown in FIG. 13. At this time, communication between the terminals A and B is made over a line where the network security is ensured by peer-to-peer connection. Thereafter, the process of transferring the coupon 21 is carried out like the transferring process (steps B5 to B14) described above with reference to FIG. 12.

The terminal B having received the coupon 21 from the terminal A transmits the coupon 21 (copy) to the coupon management server 4, and requests the coupon management server 4 to verify "validity" of the coupon 21 (step C2). The coupon management server 4 sends the coupon 21 sent from the terminal B to the PKI operation server 5 to request the PKI operation server 5 to verify electronic signatures 23 and 25 (step C3). In response to it, the PKI operation server 5 decrypts the electronic signatures 23 and 25 of the received coupon 21 with a server private key and a user private key, respectively, and verifies whether or not administrator information 22 and user information 24 are tampered.

A result of the verification is sent to the electronic shop 4 from the PKI operation server 5 via the coupon management server 5 (steps C4 and C5). When "validity" of the coupon 21 is confirmed as a result of the verification, the terminal B requests the coupon management server 4 to transfer the coupon 21 (step C6).

When receiving the transfer request, the coupon management server 4 changes "coupon status" of the coupon 21 to "provisionally transferred" in the transfer management table 40 in the storage 4a by means of the storage control unit 46, and registers "a telephone number" of the terminal B as "transferee." The coupon management server 4 generates information such as a coupon number, a transferee, a transfer number, etc., as "transfer information," sends it to the PKI operation server 5, requests the PKI operation server 5 to encrypt the "transfer information" with the user private key, and sends back the encrypted "transfer information" obtained as above back to the terminal B (steps C7 to C9).

The terminal B transmits the encrypted "transfer information" as transfer confirmation information to the terminal A (step C10). In the terminal A, the received "transfer information" is decrypted with the user private key by the browser/mailer control unit 15, then displayed on the LCD 12. The user of the terminal A confirms contents of the display (a coupon number, a transferee, a transfer number, etc.), then transmits "the transfer information" as "transfer completion notification" to the coupon management server 4 (step C11).

The coupon management server 4 confirms whether or not "the transfer completion notification" received from the terminal A is notified from the terminal A whose telephone number is registered as "issuance requester" (owner identification information) in the transfer management table 40, thereby to confirm whether or not the received "transfer completion notification" is from a rightful person of the coupon 21, then changes "the coupon state" from "provisionally transferred" to "transferred" in the transfer management table 40.

At this point of time, the terminal B becomes the rightful person of the coupon 21. The coupon management server 4 accumulates charge information 47 to the terminal A in the storage 4a by means of the charging process unit 45, and carries out a process of issuing a bill for the coupon use charge, like the charging process (steps A71 to A73) described above with reference to FIG. 10. The coupon 21 in this case is handled as the coupon 21 whose coupon use charge has been settled by the user of the terminal A. Even when the terminal B transfers the coupon 21 to the electronic shop 7 in an electronic transaction with the electronic shop 7 afterwards, the user of the terminal B is not charged for it.

At the above point of time, the user information 24 written in the coupon 21 is still user information on the terminal A. For this reason, when the user of the terminal B uses the coupon 21 transferred from the terminal A in an electronic transaction with the electronic shop 7, the terminal B sends the coupon 21 (copy) to the coupon management server 4 to request the coupon management server 4 to rewrite the user information 24 (step C12), as shown in FIG. 14.

The coupon management server 4 sends the coupon 21 received from the terminal B to the PKI operation server 5 (step C13). The PKI operation server 5 rewrites only the user information 24 and the electronic signature (user signature) 25 of the coupon 21 to the user information 24 and the user signature 25 of the terminal B which is a new owner of the coupon 21, then sends back the coupon 21 to the terminal B via the coupon management server 4 (steps C14 and C15).

Whereby, the owner displayed in the coupon 21 is changed to the user of the terminal B, matched with the owner managed in the coupon management server 4 (the transfer management table 40), thus the user of the terminal B can use the transferred coupon 21 in a new electronic transaction. Namely, the user of the terminal B can use the transferred coupon 21 to make an electronic transaction with the electronic shop 7 like when the terminal A uses the coupon 21 to make an electronic transaction with the electronic shop 7 (refer to FIG. 12).

Figure 15:
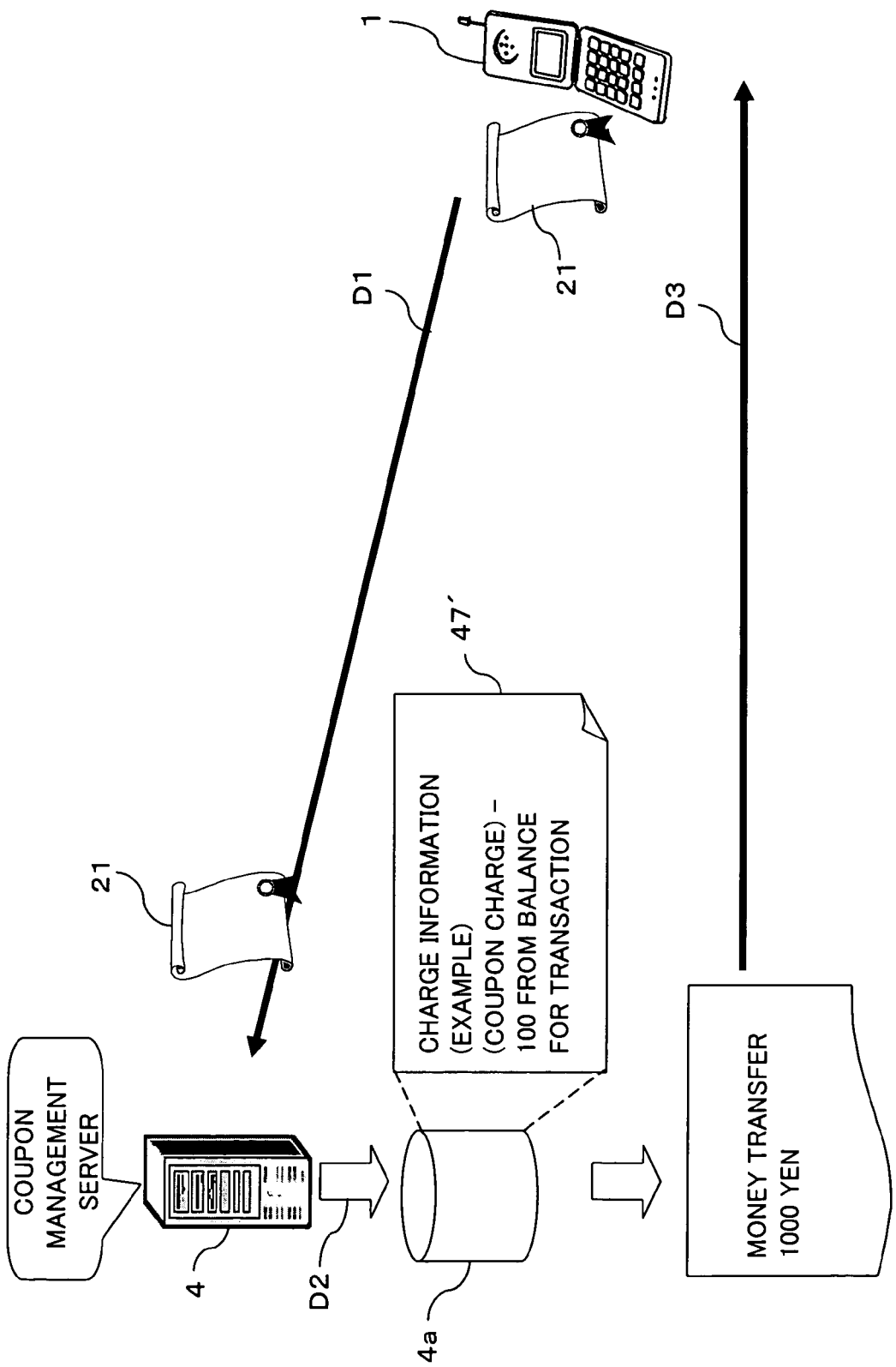
FIG. 15 is a diagram for illustrating a coupon value converting process in the electronic transaction system according to the embodiment.
Figure 16:
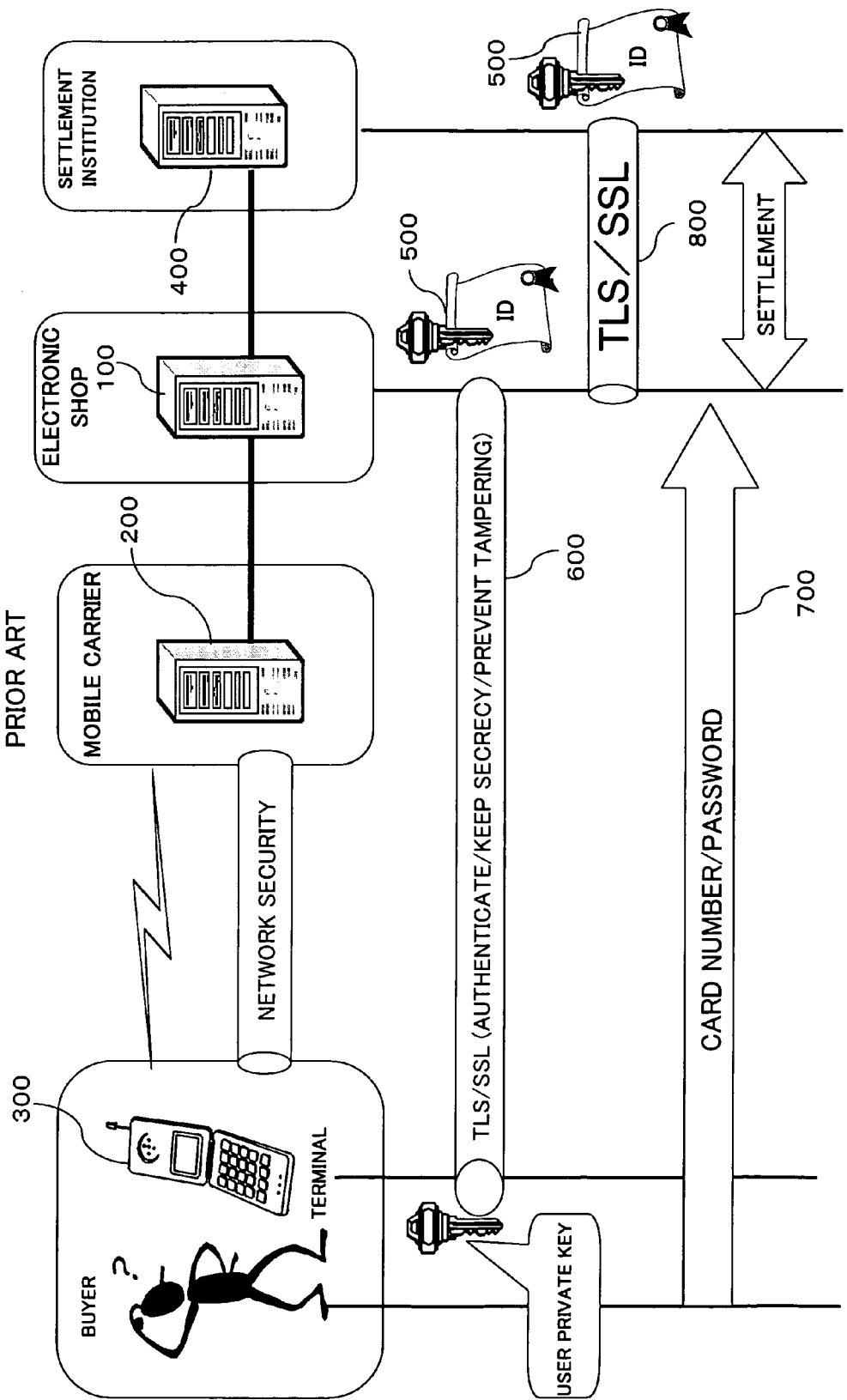
FIG. 16 is a diagram showing an example of a known electronic transaction system.
Figure 17:
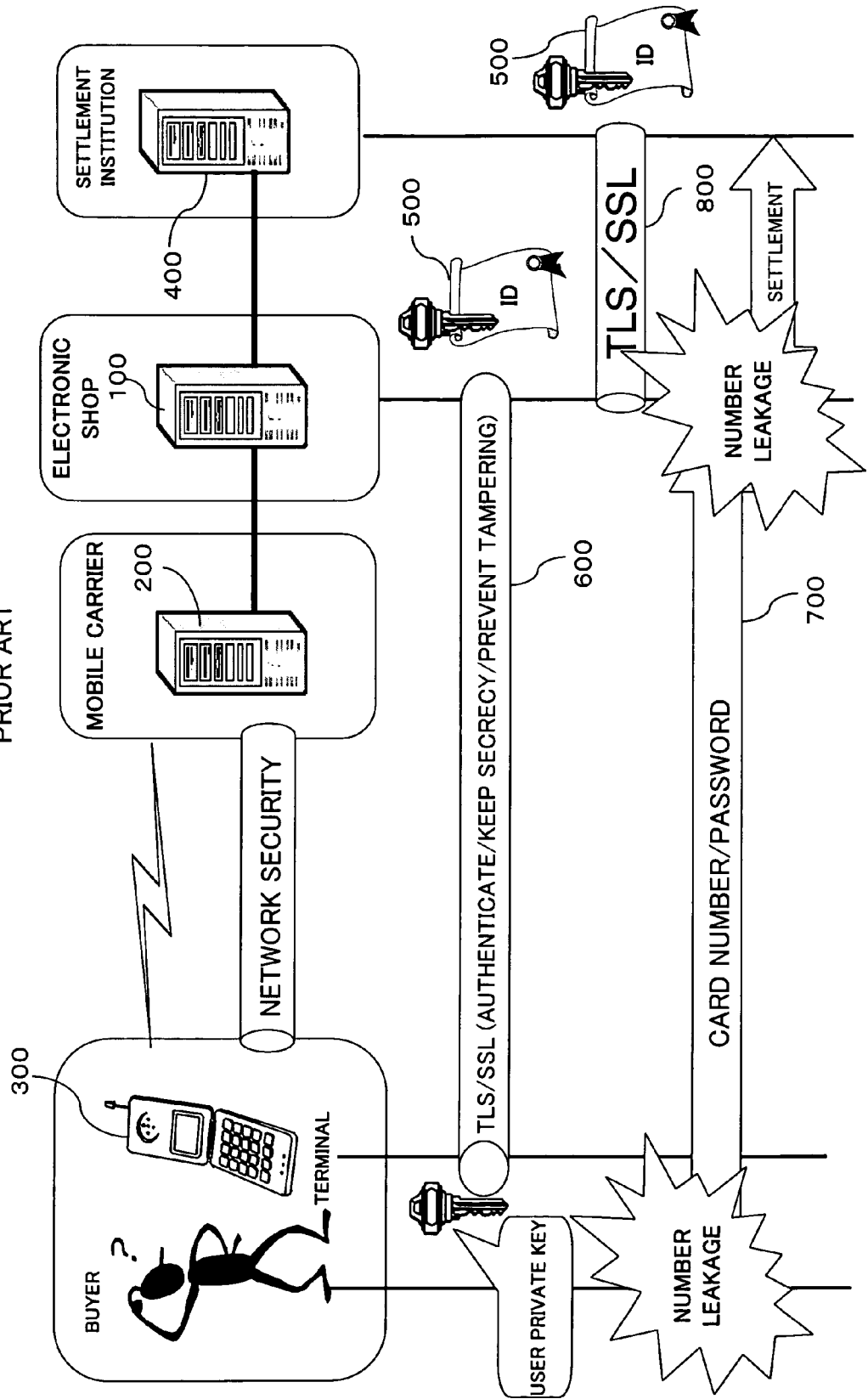
FIG. 17 is a diagram for illustrating disadvantages of the known electronic transaction system.

The terminal 1 possessing the coupon 21 can cash the coupon 21, not using it in an electronic transaction with the electronic shop 7. In which case, the terminal 1 sends a value conversion notice (cash request) together with the coupon 21 to the coupon management server 4 (step D1), as shown in FIG. 15. When receiving the value conversion notice, the coupon management server 4 generates negative charge information 47' corresponding to "the value information" of the coupon 21 to owner identification information of the received coupon 21 by means of the charge processing unit 45, and accumulates it in the storage 4a (step D2).

Thereafter, the coupon management server 4 (the charge processing unit 45) periodically totalizes coupon use charges (charge information). When the coupon use charges (claimed charges) are positive, the coupon management server 4 issues a bill 48 of an amount corresponding thereto to the terminal 1 as described above with reference to FIG. 10 to collect the coupon use charges. When the totalized coupon use charges are negative, the coupon management server 4 transfers an amount corresponding to it to a designated bank account or the like of the user of the terminal 1, and issues a transfer notice to the terminal 1 (step D3).

The user of the terminal 1 sends a value conversion notice of the coupon 21 to the coupon management server 4, whereby an amount corresponding to "value information" of the coupon 21 is transferred to a transferee, as above. The transferee can thereby cash "the value information" of the coupon 21, which improves the convenience of the coupon 21.

According to this modification, validity of the coupon 21 is confirmed, and, at this point of time, the terminal 1, a transferor, which is a rightful person of the coupon 21, is confirmed. Only after that, transfer of the coupon 21 to the terminal B is completed (rewriting of the owner identification information is completed in the coupon management server 4).

In this case, the coupon management server 4 confirms that the terminal A, which is a transferor, has transferred the coupon 21 to the terminal B, after that, rewrites owner identification information described in the coupon 21 to allow the user of the terminal B to use the coupon 21 in an electronic transaction. It is thus possible to largely improve the safety of electronic transactions using the coupons 21.

(B) Others

Use of the above coupon 21 enables terminal calls in the prepayment form, for example. In the above embodiment and modifications, the description has been made by way of example where the coupon is transferred from the terminal A to the terminal B as the user-to-user coupon transferring process. The reverse is possible, of course. Even when the terminal B further transfers the coupon 21 to other terminal, this invention can provide the same functions and effects.

In the above examples, it is premised that the coupon use charge is charged to the terminal 1 which has requested issuance of the coupon 21. Alternatively, the coupon use charge may be charged to a user of the terminal 1 who has actually used the coupon 21 in an electronic transaction. For example, at the time that "coupon status" in the transfer management table 40 is changed to "transferred" to the electronic shop 7 in the coupon management server 4, the coupon management server 4 may charge the coupon use charge to the user of the terminal 1 having used the coupon 21.

The coupon management server 4 does not always need to periodically take the bill issuing procedure as above, but may do it at irregular intervals, or do it each time the coupon 21 is transferred, or do it for each value conversion notice.

Note that the present invention is not limited to the above examples, but may be modified in various ways without departing from the scope of the invention.

INDUSTRIAL APPLICABILITY

This invention allows the electronic coupon having (pecuniary) value information and owner identification information to be used for settlement in an electronic transaction, thereby enabling an easy, safe settlement in the electronic transaction. Accordingly, great promotion in use of the electronic transactions is expected and its utility is considered to be very large.

The invention claimed is:
1. An electronic transaction method using an electronic coupon in an electronic transaction system comprising an electronic shop server opening an electronic shop site on Internet to operate and manage said electronic shop site, a coupon issuance/management server, which has a transfer management memory, issuing and managing an electronic coupon having pecuniary value information usable in a settlement of an electronic transaction for said electronic shop site, and a plurality of information terminals individually operable to access to said electronic shop and to access each other to carry out an electronic transaction, said electronic transaction method comprising:

requesting said coupon issuance/management server to issue said electronic coupon from one of said information terminals;

issuing, to said requesting information terminal having requested said electronic coupon by said coupon issuance/management server, said electronic coupon having said pecuniary value information and owner identification information related to said requesting information terminal;

recording and managing, by said coupon issuance/management server, said owner identification information of said electronic coupon as coupon management information in the transfer management memory;

at said requesting information terminal, transferring, when said requesting information terminal transfers said electronic coupon to another information terminal, said electronic coupon to said another information terminal and transmitting a coupon number of said electronic coupon, identification information of said requesting information terminal, and identification information of said another information terminal to said coupon issuance/management server; and at said coupon issuance/management server, comparing said owner identification information, which is recorded in said transfer management memory and which is associated with the coupon number with said identification information of said requesting information terminal, and if said identification information of said requesting information terminal matches the owner identification information, changing the owner identification information recorded in said transfer management memory from said identification information of said requesting information terminal to said identification information of said another information terminal.

2. The electronic transaction method according to claim 1, wherein said information terminal transfers said electronic coupon to another information terminal being as said transferee apparatus and notifies said coupon issuance/management server of the transfer; and in response to the notice, said coupon issuance/management server changes said owner identification information in said transfer management memory to information characteristic of said another information terminal.

3. The electronic transaction method according to claim 2, wherein said another information terminal transfers said electronic coupon to said electronic shop server being as said transferee apparatus due to an electronic transaction in said electronic shop site and notifies said coupon issuance/management server of the transfer; and in response to the notice, said coupon issuance/management server changes said owner identification information in said transfer management memory to information characteristic of said electronic shop server.

4. The electronic transaction method according to claim 1, wherein said coupon issuance/management server attaches electronic signature data to said pecuniary value information and said owner identification information of said electronic coupon with different encryption keys.

5. The electronic transaction method according to claim 4, wherein said coupon issuance/management server affixes said electronic signatures on said pecuniary value information and said owner identification information with a server private key characteristic of said coupon issuance/management server and a user private key characteristic of a user of said information terminal, respectively.

6. The electronic transaction method according to claim 4, wherein said transferee apparatus transferred said electronic coupon sends said electronic coupon to said coupon issuance/management server to request said coupon issuance/management server to verify validity of said electronic coupon;

said coupon issuance/management server verifies the validity of said electronic coupon on the basis of said electronic signatures affixed on said electronic coupon and notifies said transferee apparatus of a result of the verification;

when the validity of said electronic coupon is confirmed on the basis of a result of the verification, said transferee apparatus requests said coupon issuance/management server to change an owner of said electronic coupon; and in response to the owner change request, said coupon issuance/management server confirms said information terminal, which is a transferor of said electronic coupon, that said information terminal has transferred said electronic coupon, and changes said owner identification information.

7. The electronic transaction method according to claim 1, wherein said coupon issuance/management server sets a term of validity to said electronic coupon, and records and manages information on said term of validity as a part of said coupon management information in said transfer management memory.

8. The electronic transaction method according to claim 1, wherein said coupon issuance/management server records and manages progress information on a status of progress of issuance and transfer of said electronic coupon as a part of said coupon management information in said transfer management memory, and carries out a process according to said progress information in said transfer management memory.

9. The electronic transaction method according to claim 1, wherein said information terminal holds said electronic coupon in a terminal-side memory, to which an access is inhibited or allowed by inputting password information, and inhibits an access to said electronic coupon by inputting said password information.

10. The electronic transaction method according to claim 9, wherein, when transferring said electronic coupon to said transferee apparatus, the information terminal allows an access to said terminal-side memory by inputting said password information, reads said electronic coupon from said terminal-side memory, and sends said electronic coupon to said transferee apparatus.

11. The electronic transaction method according to claim 1, wherein said information terminal holds said electronic coupon in an IC card, an access to said IC card being inhibited by inputting a personal identification number (PIN) as said password information, and allowed by inputting a PIN block as said password information.

12. The electronic transaction method according to claim 9, wherein said information terminal has a displaying means, and records and manages information on a status of progress of transfer of said electronic coupon in said terminal-side memory, and can display said information on said displaying means.

13. The electronic transaction method according to claim 1, wherein said electronic coupon is electronic money.

* * * * *